United States Patent
Lv et al.

(10) Patent No.: US 12,437,496 B2
(45) Date of Patent: Oct. 7, 2025

(54) METHOD AND APPARATUS FOR FACIAL RECOGNITION

(71) Applicant: HONOR DEVICE CO., LTD., Shenzhen (CN)

(72) Inventors: Jianming Lv, Shenzhen (CN); Jiangfeng Yuan, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/918,816

(22) PCT Filed: Apr. 27, 2022

(86) PCT No.: PCT/CN2022/089586
§ 371 (c)(1),
(2) Date: Oct. 13, 2022

(87) PCT Pub. No.: WO2023/015958
PCT Pub. Date: Feb. 16, 2023

(65) Prior Publication Data
US 2024/0221340 A1 Jul. 4, 2024

(30) Foreign Application Priority Data
Aug. 11, 2021 (CN) .......................... 202110920396.1

(51) Int. Cl.
*G06V 10/141* (2022.01)
*G06F 21/32* (2013.01)
(Continued)

(52) U.S. Cl.
CPC ............ *G06V 10/141* (2022.01); *G06F 21/32* (2013.01); *G06V 40/172* (2022.01); *G06V 40/40* (2022.01)

(58) Field of Classification Search
CPC .... G06V 10/141; G06V 40/172; G06V 40/40; G06V 10/94; G06V 40/166; G06V 40/179; G06F 21/32
See application file for complete search history.

(56) References Cited

U.S. PATENT DOCUMENTS

| | | | |
|---|---|---|---|
| 2004/0150724 | A1 | 8/2004 | Nozaki et al. |
| 2013/0246270 | A1* | 9/2013 | Du ........................ G10L 17/00 382/118 |

(Continued)

FOREIGN PATENT DOCUMENTS

| | | |
|---|---|---|
| CN | 107863678 A | 3/2018 |
| CN | 108509914 A | 9/2018 |

(Continued)

OTHER PUBLICATIONS

Xu Muhong;"Research of face recognitiontechnology andtest methodsin security field";Information and Communications Technology and Policy;May 31, 2019;8pages.

*Primary Examiner* — Stephen R Koziol
*Assistant Examiner* — Joshua Chen
(74) *Attorney, Agent, or Firm* — WOMBLE BOND DICKINSON (US) LLP

(57) ABSTRACT

Embodiments of this application relate to the terminal field, and provide a method and an apparatus for facial recognition so as to improve security of facial recognition. The method is applied to an electronic device, where the electronic device includes a TOF camera module, and the TOF camera module includes a transmitter configured to transmit a light signal. The method includes: receiving a first operation by a user, where the first operation is used to trigger the TOF camera module to work; controlling the transmitter to work at a first current value; controlling, in a case that the transmitter is working at a first current value, the transmitter (Continued)

to work at a second current value, where the second light intensity is higher than the first light intensity.

20 Claims, 19 Drawing Sheets

(51) Int. Cl.
  *G06V 10/94* (2022.01)
  *G06V 40/16* (2022.01)
  *G06V 40/40* (2022.01)

(56) References Cited

U.S. PATENT DOCUMENTS

| | | | |
|---|---|---|---|
| 2019/0207932 A1* | 7/2019 | Bud | H04L 63/0861 |
| 2019/0383919 A1 | 12/2019 | Lee et al. | |
| 2020/0082520 A1 | 3/2020 | Tang et al. | |
| 2020/0142071 A1* | 5/2020 | Park | G06V 40/166 |
| 2020/0175260 A1* | 6/2020 | Cheng | G06T 7/50 |
| 2021/0406350 A1 | 12/2021 | Chen et al. | |
| 2022/0090914 A1 | 3/2022 | Yin et al. | |
| 2022/0268935 A1* | 8/2022 | Huh | H04N 23/61 |

FOREIGN PATENT DOCUMENTS

| | | | | |
|---|---|---|---|---|
| CN | 108769509 A | * | 11/2018 | ............ H04M 1/026 |
| CN | 108960061 A | | 12/2018 | |
| CN | 109271916 A | | 1/2019 | |
| CN | 109635539 A | | 4/2019 | |
| CN | 109788622 A | | 5/2019 | |
| CN | 109831255 A | | 5/2019 | |
| CN | 109861757 A | | 6/2019 | |
| CN | 109977929 A | | 7/2019 | |
| CN | 110324521 A | | 10/2019 | |
| CN | 111095297 A | | 5/2020 | |
| CN | 112099051 A | | 12/2020 | |
| CN | 213602713 U | | 7/2021 | |
| CN | 113807172 A | | 12/2021 | |
| CN | 114863510 A | | 8/2022 | |
| EP | 3567851 A1 | | 11/2019 | |
| WO | 2020052282 A1 | | 3/2020 | |
| WO | 2020156096 A1 | | 8/2020 | |
| WO | 2021037157 A1 | | 3/2021 | |

* cited by examiner

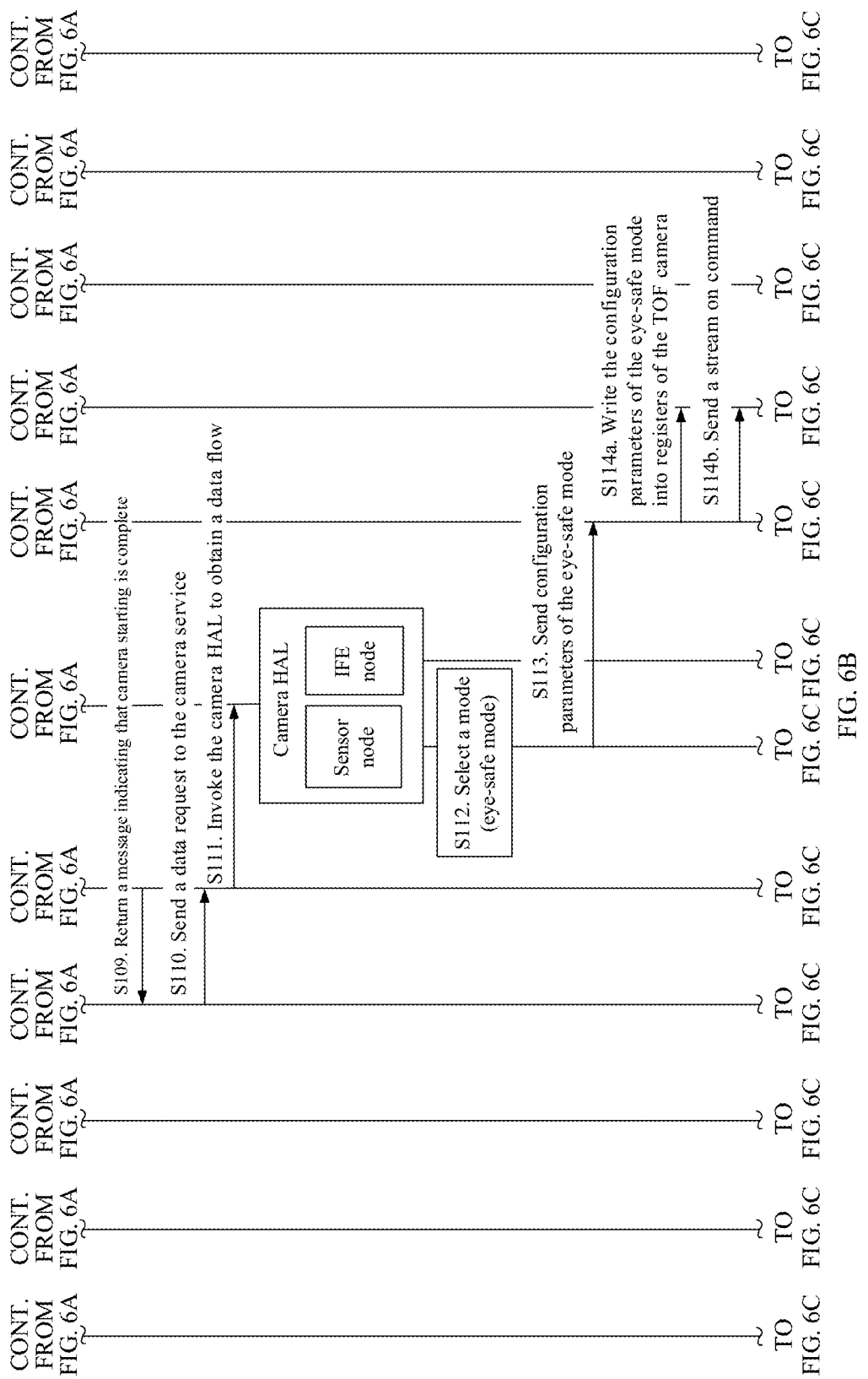

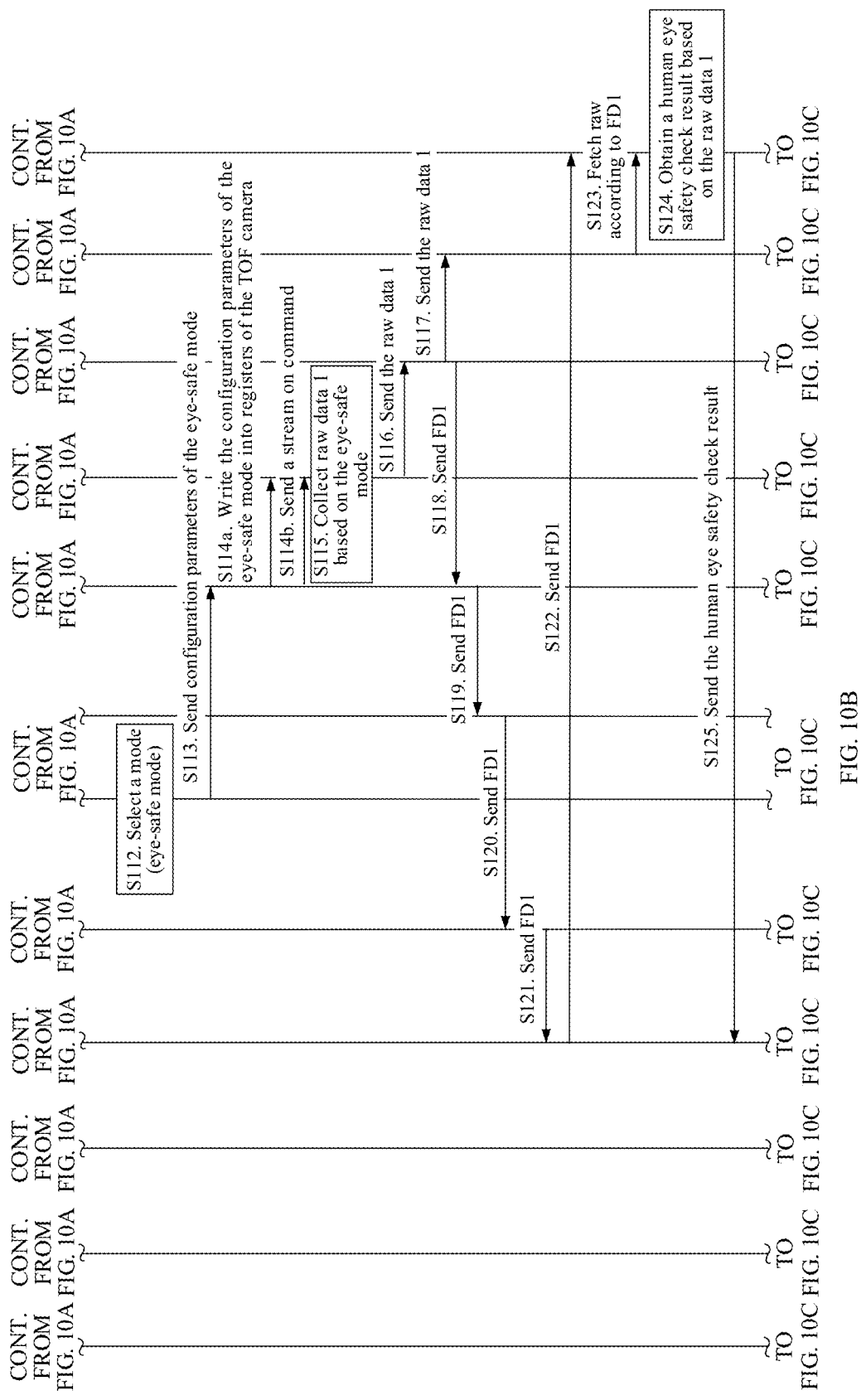

METHOD AND APPARATUS FOR FACIAL RECOGNITION

CROSS-REFERENCE TO RELATED APPLICATIONS

This application is a National Stage of International Application No. PCT/CN2022/089586, filed Apr. 27, 2022, which claims priority to Chinese Patent Application No. 202110920396.1, filed Aug. 11, 2021, both of which are hereby incorporated by reference in their entireties.

TECHNICAL FIELD

This application relates to the terminal field, and in particular, to a method and an apparatus for facial recognition.

BACKGROUND

At present, facial recognition is widely used in electronic devices for identity authentication scenarios. Facial recognition currently adopts planar (2D) facial feature detection technology, where facial features extracted are 2D features. Such technology is vulnerable to identity spoofing attacks (for example, pretending to be a device owner by using a photo of the owner), featuring low security.

SUMMARY

Embodiments of this application provide a method and an apparatus for facial recognition such that security of facial recognition can be improved.

According to a first aspect, an embodiment of this application provides a facial recognition method, applied to an electronic device, where the electronic device includes a time of flight TOF camera module, and the TOF camera module includes a transmitter configured to transmit a light signal and an image sensor configured to receive reflected light and make an image; and the method includes: receiving a first operation by a user, where the first operation is used to trigger facial recognition; controlling the transmitter to work at a first light intensity; determining whether the transmitter is in a normal working state; controlling, in a case that the transmitter is in a normal working state, the transmitter to work at a second light intensity, where the second light intensity is higher than the first light intensity; controlling the image sensor to collect image data; and performing the facial recognition based on the image data.

Based on the method provided in this embodiment of this application, it is determined whether the transmitter is in a normal working state when the transmitter is working at the first light intensity. If the transmitter is in a normal working state, the transmitter is then controlled to work at the second light intensity. The second light intensity is higher than the first light intensity. Because the first light intensity is lower, the first light intensity does not injure a human eye, thus ensuring human eye safety. If the transmitter is able to work normally to transmit a light signal of the first light intensity, it indicates that the transmitter is sound and undamaged, so that the electronic device can properly control the transmitter. Therefore, when the transmitter works at the higher second light intensity, human eye safety can also be ensured while transmission of a light signal injuring a human eye due to damage is avoided. In addition, when the transmitter works at the second light intensity, it can be ensured that the image sensor collects more accurate image data, so that facial recognition is more accurate.

Moreover, image data collected by the TOF camera module is 3D facial data. Performing facial recognition based on 3D facial data is more secure and accurate than that based on 2D facial data.

In a possible implementation, a light signal transmitted by the transmitter working at a first current value has the first light intensity, and a light signal transmitted by the transmitter working at a second current value has the second light intensity, where the second current value is greater than the first current value. In other words, a greater current value at which the transmitter is working means a higher light intensity of a light signal transmitted by the transmitter.

In a possible implementation, the determining whether the transmitter is in a normal working state includes: determining a first parameter of the transmitter, where the first parameter is used to indicate a working state of the transmitter; and if the first parameter is used to indicate that the working state of the transmitter is a normal working state, determining that the transmitter is in a normal working state; or if the first parameter is used to indicate that the working state of the transmitter is an abnormal working state, determining that the transmitter is in an abnormal working state. The first parameter of the transmitter may be generated after the transmitter transmits a light signal of the first light intensity during working at the first current value.

In a possible implementation, the method further includes: controlling, in a case that the transmitter is in an abnormal working state, the transmitter to work at a third light intensity, where the third light intensity is 0; controlling the image sensor to collect image data; and performing the facial recognition based on the image data. Because the transmitter is in an abnormal working state where the transmitter may not be working, transmission of a light signal injuring a human eye due to damage of the transmitter can be avoided.

In a possible implementation, the performing the facial recognition based on the image data includes: obtaining a greyscale image and a depth image based on the image data; and performing a face comparison based on the greyscale image and performing an anti-counterfeiting check based on the depth image, to obtain a facial recognition result. If a face comparison result meets a first preset condition and an anti-counterfeiting check result meets a second preset condition, the facial recognition result may be considered as success, such that an operation such as unlock can be performed.

In a possible implementation, the first operation includes an operation for unlocking the electronic device, an operation for online payment, an operation for face enrollment, or an operation for secure registration with or login to an application program. The first operation may be an operation such as pressing a power button, tapping, or sliding. This is not limited in this application.

In a possible implementation, the method further includes: determining whether to perform unlock according to the facial recognition result; and if the facial recognition result is success, performing unlock; or if the facial recognition result is failure, displaying an unlock failure or skipping performing unlock; or determining whether to perform payment according to the facial recognition result; and if the facial recognition result is success, performing payment; or if the facial recognition result is failure, displaying a payment failure or skipping performing payment; or determining whether to perform face enrollment according to the facial recognition result; and if the facial recognition result is success, performing face enrollment; or if the facial recognition result is failure, displaying a face enrollment failure or skipping performing face enrollment; or determining whether to perform registration or login according to the facial recognition result; and if the facial recognition result is success, performing registration or login; or if the facial recognition result is failure, displaying a registration or login failure or skipping performing registration or login. Therefore, this application can be used in scenarios such as facial recognition during payment or transfer (for example, a user performs a payment or transfer operation with a payment application, wealth management application, chat application, or shopping application (for example, Alipay®, WeChat®, or Taobao®)) and face verification during a user's secure registration with or login to an application program (for example, a user performs a registration or login operation with Bank of China®). This is not limited in this application.

In a possible implementation, the method further includes: in a case that the transmitter is in an abnormal working state, altering the user of an unlock failure; or altering the user of a payment failure; or altering the user of a face enrollment failure; or altering the user of a registration or login failure. Because the transmitter is in an abnormal working state where the transmitter is not working, face recognition will not be successful. However, this can avoid transmission of a light signal injuring a human eye due to damage of the transmitter.

In a possible implementation, the electronic device includes a camera hardware abstraction layer HAL and a camera driver module, the camera HAL including a sensor node, and the controlling the transmitter to work at a first light intensity includes: determining, by the sensor node, a working mode of the camera module to be a first working mode, where the first working mode is used to indicate that the transmitter is to work at the first current value; sending, by the sensor node, configuration parameters of the first working mode to the camera driver module; writing, by the camera driver module, the configuration parameters of the first working mode into registers of the TOF camera module; sending, by the camera driver module to the sensor node, a message indicating that writing the configuration parameters is complete; in response to receiving the message indicating that writing the configuration parameters is complete, sending, by the sensor node, a first stream on command to the camera driver module; sending, by the camera driver module, a second stream on command to the TOF camera module; and working, by the transmitter, at the first current value, where a light signal transmitted by the transmitter working at the first current value has the first light intensity. In this way, the camera HAL (which includes the sensor node) and camera driver module in the electronic device can control the transmitter to work at the first light intensity.

In a possible implementation, the electronic device further includes a first application, a facial recognition software development kit SDK, a facial recognition service, a facial recognition control module, and a camera service, and after the receiving a first operation by a user, the method further includes: invoking, by the first application, the facial recognition SDK to perform the facial recognition, where the first application corresponds to the first operation, and the first application includes a screen lock application, a shopping application, a chat application, or a wealth management application; sending, by the facial recognition SDK, a facial recognition request to the facial recognition service, where the facial recognition request carries a facial recognition type identifier, an image resolution, and a data flow format; sending, by the facial recognition service, the facial recognition request to the facial recognition control module; matching, by the facial recognition control module, a camera module according to the facial recognition request; sending, by the facial recognition control module to the camera service, a first request for starting a camera module, where the first request for starting a camera module carries a security flag, a camera module identifier ID, an image resolution, and a data flow format, and the security flag is used for requesting a secure buffer; and sending, by the camera service to the camera HAL, a second request for starting a camera module, where the second request carries the security flag, the camera module identifier ID, the image resolution, and the data flow format. In this way, the sensor node in the camera HAL is able to obtain information such as the security flag, the camera module identifier ID, the image resolution, and the data flow format, and can subsequently determine the working mode of the camera module based on the information.

In a possible implementation, the determining, by the sensor node, a working mode of the camera module to be a first working mode specifically includes: determining, by the sensor node according to the image resolution, the data flow format, and a preset rule, the working mode of the camera module to be the first working mode. Thus, the sensor node can determine the working mode of the camera module to be the first working mode.

In a possible implementation, after the sending, by the camera service to the camera HAL, a second request for starting a camera module, the method further includes: creating, by the camera HAL based on the camera module ID, the image resolution, and the data flow format, a path for transmitting a data flow and a path for transmitting a control flow; returning, by the camera HAL, a path creation result to the camera service, where the path creation result is success; returning, by the camera service to the facial recognition control module, a message indicating that camera module starting is complete; sending, by the facial recognition control module, a data request to the camera service, where the data request is used to obtain a data flow; and invoking, by the camera service, the camera HAL to obtain the data flow.

In a possible implementation, after the working, by the transmitter, at the first current value, the method further includes: obtaining, by the image sensor, a light signal within an exposure time corresponding to the first working mode; and obtaining, by the image sensor, first image data based on the received light signal.

In a possible implementation, after the obtaining, by the image sensor, first image data, the method further includes: sending, by the image sensor to the transmitter, a request for obtaining a first parameter; receiving, by the image sensor, the first parameter from the transmitter; and obtaining, by the image sensor, first raw data based on the first image data and the first parameter, where the first parameter is used to indicate a working state of the transmitter under the first current value.

In a possible implementation, the electronic device further includes an image processing module, a first memory, and a face TA, and the determining whether the transmitter is in a normal working state includes: after the obtaining, by the image sensor, first raw data based on the first image data and the first parameter, sending, by the image sensor, the first raw data to the image processing module; sending, by the image processing module, the first raw data to the first memory for storage, where the first memory corresponds to a first FD; fetching, by the face TA according to the first FD, the first raw data from the first memory; and determining, by the face TA based on the first raw data, whether the transmitter is in a normal working state. Thus, whether the transmitter is in a normal working state can be determined by the face TA in the electronic device.

In a possible implementation, the determining, by the face TA based on the first raw data, whether the transmitter is in a normal working state specifically includes: obtaining, by the face TA, the first parameter from the first raw data; and if the first parameter is used to indicate that the working state of the transmitter is a normal working state, determining, by the face TA, that the transmitter is in a normal working state; or if the first parameter is used to indicate that the working state of the transmitter is an abnormal working state, determining, by the face TA, that the transmitter is in an abnormal working state. Thus, facial recognition can determine, based on the first parameter in the first raw data, whether the transmitter is in a normal working state.

In a possible implementation, after the sending, by the image processing module, the first raw data to the first memory for storage, the method further includes: sending, by the image processing module, the first FD to the camera driver module; sending, by the camera driver module, the first FD to the camera HAL; sending, by the camera HAL, the first FD to the camera service; sending, by the camera service, the first FD to the facial recognition control module; sending, by the facial recognition control module, the first FD to the face trusted application TA, where the face TA includes a TOF algorithm and a face ID algorithm, the TOF algorithm is used to convert the first raw data into a greyscale image and a depth image, and the face ID algorithm is used to perform face matching based on the greyscale image and perform an anti-counterfeiting check based on the depth image; and in response to receiving the first FD sent by the facial recognition control module, fetching, by the face TA according to the first FD, the first raw data from the first memory. In this way, the face TA can obtain the first FD according to which the first raw data can be fetched from the first memory.

In a possible implementation, after the determining, by the face TA, that the transmitter is in a normal working state, the method further includes: sending, by the face TA, the working state of the transmitter to the face control module, where the working state of the transmitter is a normal working state; and sending, by the face control module, the working state of the transmitter to the camera service; and in response to receiving the working state of the transmitter, sending, by the camera service, the working state of the transmitter to the camera HAL; or sending, by the face control module, the working state of the transmitter to the camera HAL. In this way, the camera HAL can obtain the working state of the transmitter.

In a possible implementation, the controlling the transmitter to work at a second light intensity includes: in response to receiving the working state of the transmitter which is a normal working state, determining, by the camera HAL, the working mode of the camera module to be a second working mode, where the second working mode is used to indicate that the transmitter is to work at the second current value; sending, by the camera HAL, configuration parameters of the second working mode to the camera driver module; writing, by the camera driver module, the configuration parameters of the second working mode into registers of the TOF camera module; sending, by the camera driver module to the sensor node, a message indicating that writing the configuration parameters is complete; in response to receiving the message indicating that writing the configuration parameters is complete, sending, by the sensor node, a third stream on command to the camera driver module; sending, by the camera driver module, a fourth stream on command to the TOF camera module; and working, by the transmitter, at the second current value, where a light signal transmitted by the transmitter working at the second current value has the second light intensity. In this way, the camera HAL can determine, according to the normal working state of the transmitter, the working mode of the camera module to be the second working mode. The camera HAL (which includes the sensor node) and camera driver module in the electronic device can control the transmitter to work at the second light intensity.

In a possible implementation, after the working, by the transmitter, at the second current value, the controlling the image sensor to collect image data specifically includes: obtaining, by the image sensor, a light signal within an exposure time corresponding to the second working mode; and obtaining, by the image sensor, second image data based on the received light signal.

In a possible implementation, after the obtaining, by the image sensor, second image data, the method further includes: sending, by the image sensor to the transmitter, a request for obtaining a second parameter; receiving, by the image sensor, the second parameter from the transmitter; and obtaining, by the image sensor, second raw data based on the first image data and the second parameter, where the second parameter is used to indicate a working state of the transmitter under the second current value.

In a possible implementation, the performing the facial recognition based on the image data includes: sending, by the image sensor, the second raw data to the image processing module; sending, by the image processing module, the second raw data to a second memory for storage, where the second memory corresponds to a second FD; fetching, by the face TA according to the second FD, the second raw data from the second memory; obtaining, by the face TA, a first greyscale image and a first depth image based on image data in the second raw data; and performing, by the face TA, a face comparison based on the first greyscale image and performing an anti-counterfeiting check based on the first depth image, to obtain a facial recognition result. In this way, the face TA can determine the facial recognition result based on the second raw data.

In a possible implementation, after the sending, by the image processing module, the second raw data to a second memory for storage, the method further includes: sending, by the image processing module, the second FD to the camera driver module; sending, by the camera driver module, the second FD to the camera HAL; sending, by the camera HAL, the second FD to the camera service through a preset interface; sending, by the camera service, the second FD to the facial recognition control module; and sending, by the facial recognition control module, the second FD to the face TA. In this way, the face TA can obtain the second FD according to which the second raw data can be fetched.

In a possible implementation, the method further includes: sending, by the face TA, the facial recognition result to the facial recognition control module; sending, by the facial recognition control module, the facial recognition result to the facial recognition service; sending, by the facial recognition service, the facial recognition result to the facial recognition SDK; sending, by the facial recognition SDK, the facial recognition result to the first application; and in response to receiving the facial recognition result, performing, by the first application, unlock, where the facial recognition result is success. Thus, when the facial recognition result is success, unlock can be successful.

In a possible implementation, the controlling, in a case that the transmitter is in an abnormal working state, the transmitter to work at a third light intensity specifically includes: in response to receiving the working state of the transmitter which is an abnormal working state, determining, by the camera HAL, the working mode of the camera module to be a third working mode, where the third working mode is used to indicate that the transmitter is to work at a third current value, and the third current value is 0; sending, by the camera HAL, configuration parameters of the third working mode to the camera driver module; writing, by the camera driver module, the configuration parameters of the third working mode into registers of the TOF camera module; sending, by the camera driver module to the sensor node, a message indicating that writing the configuration parameters is complete; in response to receiving the message indicating that writing the configuration parameters is complete, sending, by the sensor node, a fifth stream on command to the camera driver module; sending, by the camera driver module, a sixth stream on command to the TOF camera module; and stopping working, by the transmitter. Because the transmitter is in an abnormal working state where the transmitter is not working, transmission of a light signal injuring a human eye due to damage of the transmitter can be avoided.

In a possible implementation, after the stopping working, by the transmitter, the method further includes: receiving, by the image sensor, a light signal within an exposure time corresponding to the third working mode; and obtaining, by the image sensor, third image data based on the received light signal.

In a possible implementation, the method further includes: obtaining, by the face TA, a second greyscale image and a second depth image based on the third image data; and performing a face comparison based on the second greyscale image and performing an anti-counterfeiting check based on the second depth image, to obtain a facial recognition result that is failure. When the transmitter is not working (being not energized and not transmitting light), image data (the third image data) obtained by the image sensor is usually a "black picture" without a clear face image. Therefore, the facial recognition result is failure.

In a possible implementation, the method further includes: sending, by the face TA, the facial recognition result to the facial recognition control module; sending, by the facial recognition control module, the facial recognition result to the facial recognition service; sending, by the facial recognition service, the facial recognition result to the facial recognition SDK; sending, by the facial recognition SDK, the facial recognition result to the first application; and in response to receiving the facial recognition result, displaying, by the first application, an unlock failure or skipping performing unlock, where the facial recognition result is failure. Because the transmitter is in an abnormal working state where the transmitter is not working, the facial recognition result is failure such that unlock fails. However, this can avoid transmission of a light signal injuring a human eye due to damage of the transmitter.

According to a second aspect, this application provides a system on chip, where the system on chip includes one or more interface circuits and one or more processors; the interface circuit(s) and the processor(s) are interconnected by lines; the system on chip may be applied to an electronic device that includes a communications module and a memory; the interface circuit is configured to receive a signal from the memory of the electronic device and send the received signal to the processor, where the signal includes a computer instruction stored in the memory; and when the processor executes the computer instruction, the electronic device is able to perform the method according to any one of the first aspect and the possible designs of the first aspect.

According to a third aspect, this application provides a computer-readable storage medium, where the computer-readable storage medium includes computer instructions. When the computer instructions run on an electronic device (for example, a mobile phone), the electronic device is caused to perform the method according to any one of the first aspect and the possible designs of the first aspect.

According to a fourth aspect, this application provides a computer program product. When the computer program product runs on a computer, the computer is caused to perform the method according to any one of the first aspect and the possible designs of the first aspect.

According to a fifth aspect, an embodiment of this application provides a facial recognition apparatus, including a processor, where the processor is coupled to a memory which stores a program instruction. When the program instruction stored in the memory is executed by the processor, the apparatus is caused to perform the method according to any one of the first aspect and the possible designs of the first aspect. The apparatus may be an electronic device or a server device; or may be a constituent part of an electronic device or a server device, for example, a chip.

According to a sixth aspect, an embodiment of this application provides a facial recognition apparatus. The apparatus may be divided into different logical units or modules by function. The units or modules execute different functions so that the apparatus performs the method according to any one of the first aspect and the possible designs of the first aspect.

It can be understood that for beneficial effects that can be achieved by the system on chip according to the second aspect, the computer-readable storage medium according to the third aspect, the computer program product according to the fourth aspect, and the apparatuses according to the fifth aspect and the sixth aspect, reference may be made to the beneficial effects in any one of the first aspect and the possible designs of the first aspect. Details are not described herein again.

BRIEF DESCRIPTION OF DRAWINGS

FIG. 6A to FIG. 6F are schematic diagrams of signal interaction according to an embodiment of this application;

FIG. 10A to FIG. 10D are other schematic diagrams of signal interaction according to an embodiment of this application.

DESCRIPTION OF EMBODIMENTS

Figure 1:
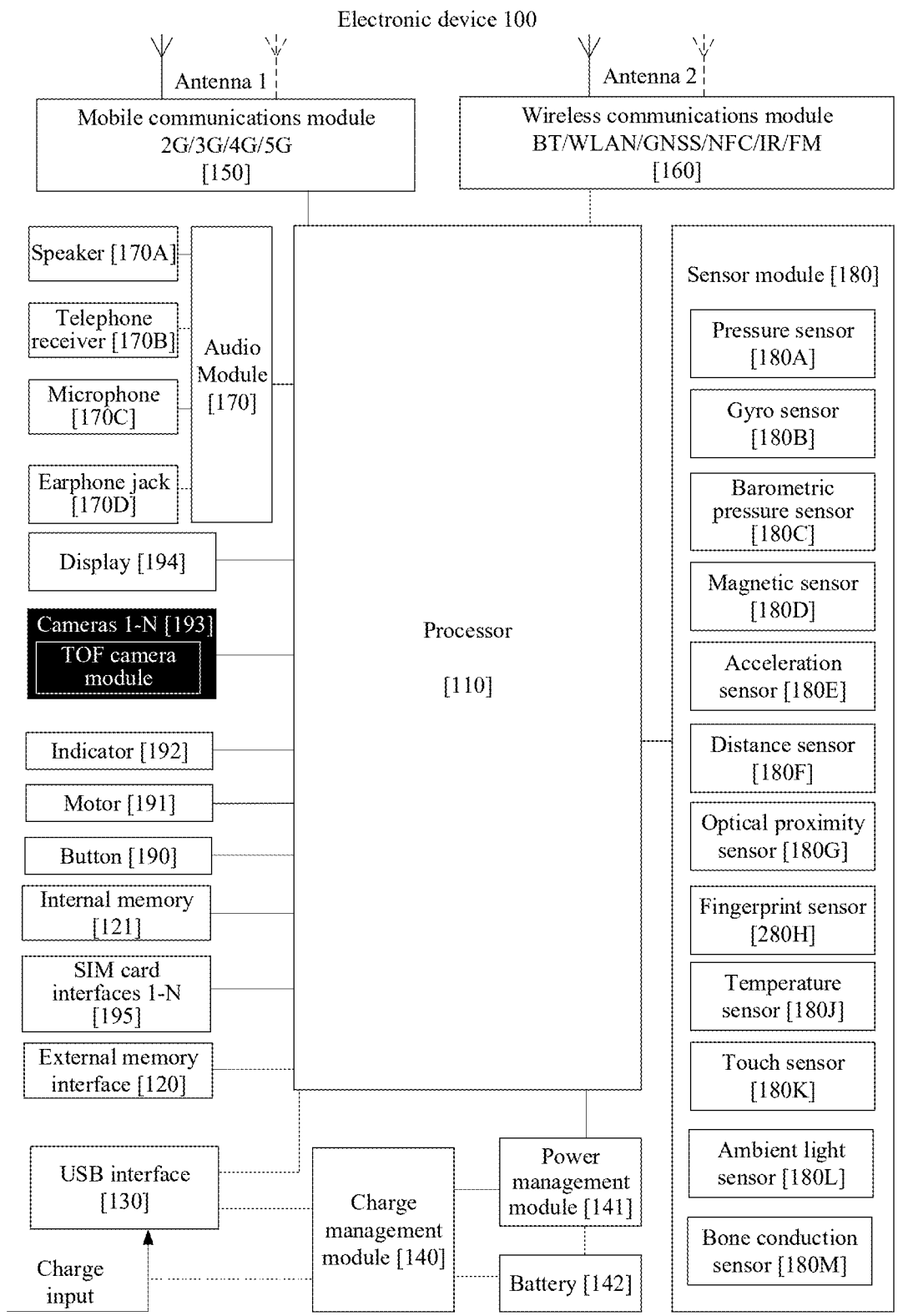
FIG. 1 is a schematic structural diagram of an electronic device according to an embodiment of this application.

The following describes technical solutions in embodiments of this application with reference to accompanying drawings in the embodiments of this application. In descriptions of this application, "at least one" means one or more than one and "a plurality of" means two or more than two, unless otherwise specified. In addition, to clearly describe the technical solutions in the embodiments of this application, words such as "first" and "second" are used in the embodiments of this application to distinguish between identical or similar items that have substantially a same function and purpose. A person skilled in the art can understand that the words such as "first" and "second" do not define quantities or execution orders, and the words such as "first" and "second" do not indicate a definite difference.

For clear and concise description of the following embodiments, a brief introduction to related concepts or technologies is given first:

Rich execution environment (rich execution environment, REE): Also referred to as a universal execution environment, or a common execution environment, or an untrusted execution environment, REE provides a system operating environment on a mobile side where operating systems such as Android, iOS, or Linux can be run. REE features good openness and scalability but undesirable security.

Trusted execution environment (trusted execution environment, TEE): Also referred to as a secure side or a secure area. TEE is an area that requires authorization for access. TEE coexists with REE in an operating environment of an electronic device, isolated from REE with the support of hardware. TEE provides security capabilities, able to resist conventional software attacks to which the REE side is vulnerable. TEE has its own running space with strict protection defined and therefore has a higher security level than REE, and is able to protect assets (assets) such as data and software in it against software attacks and defend against particular types of security threats.

REE+TEE architecture: This is an architecture in which TEE and REE are combined to jointly provide services for applications. Therefore, TEE and REE coexist on an electronic device. For example, TEE can be separated from REE with the support of hardware. TEE has its own running space and therefore has a higher security level than REE, and is able to protect assets (such as data and software) in it against software attacks. Only authorized security software can be executed on the TEE, and TEE also protects confidentiality of resources and data of the security software. Compared with REE, TEE can better protect security of data and resources by virtue of its protection mechanisms, such as isolation and permission control.

TA, or trusted application, is an application running on a TEE, which can provide security services, such as password input, transaction signature generation, or facial recognition, for CAs running outside the TEE.

CA means client application. A CA is generally an application running on REE. A CA can call a TA through an application programming interface (application programming interface, API) of a client (Client), instructing the TA to perform a corresponding security operation.

Software development kit (software development kit, SDK): In a broad sense, it is a collection of related documents, examples, and tools that assist in developing a type of software.

Raw data, or raw data, may be understood as "unprocessed and uncompressed data". In the embodiments of this application, raw data may be raw data of a digital signal resulting from conversion of a light source signal captured by a TOF camera. Raw data also records some metadata (Metadata) generated by camera shooting.

Metadata, also known as intermediary data or relay data, is data about data (data about data). It is mainly information describing properties (property) of data. In the embodiments of this application, metadata may indicate a working mode of a camera, a lighting current value, a working state of a TOF camera device, an exposure value, and other information.

A TOF camera (a TOF camera module) may include a transmitter (TX) and a receiver (RX) with the TX transmitting infrared light or laser pulses and the RX receiving reflected light and making images. Because the TX is able to autonomously transmit light signals for imaging, TOF images are free from impact by most of ambient light. Thus, applying TOF images in an unlock service can improve security of facial recognition.

Time of flight (time of flight, TOF) imaging is an imaging technology by which a time or phase difference between transmission of a group of infrared light (or laser pulses) invisible to human eyes and reflection of it back onto a camera from an object it meets is calculated, and data is collected to obtain a set of distance depth data, so as to create a three-dimensional 3D model. That is, the TOF imaging technology adds depth information from a Z-axis direction on the basis of traditional 2D XY imaging to finally generate 3D image information.

When the TOF imaging technology is adopted, infrared light, laser, or the like needs to be projected onto a face. For safety of human eyes, it is necessary to examine optical power of light transmitted by a TX to ensure that the optical power is within a range safe for human eyes, thus preventing a light signal transmitted by the TX from injuring a human eye.

The embodiments of this application provide a facial recognition method, where a TOF camera is used to collect an image. The TOF camera may first work in an eye-safe mode to determine whether a TX is abnormal, and if the TX is working normally, the TOF camera can be normally used to collect an image. This can ensure that optical power of light transmitted by the TX is within the range safe for human eyes. If the TX is abnormal, the TX can be shut down to prevent a light signal transmitted by the TX from injuring a human eye.

FIG. 1 is a schematic structural diagram of an electronic device 100 according to an embodiment of this application.

As shown in FIG. 1, the electronic device 100 may include a processor 110, an external memory interface 120, an internal memory 121, a universal serial bus (universal serial bus, USB) interface 130, a charge management module 140, a power management module 141, a battery 142, an antenna 1, an antenna 2, a mobile communications module 150, a wireless communications module 160, an audio module 170, a speaker 170A, a telephone receiver 170B, a microphone 170C, an earphone jack 170D, a sensor module 180, a button 190, a motor 191, an indicator 192, a camera 193, a display 194, a subscriber identity module (subscriber identification module, SIM) card interface 195, and the like.

The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure illustrated in this embodiment does not constitute a specific limitation on the electronic device 100. In some other embodiments, the electronic device 100 may include more or fewer components than shown in the figure, or combine some components, or split some components, or have a different component arrangement. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be separate components or may be integrated into one or more processors.

The controller may be a nerve center and command center of the electronic device 100. The controller may generate an operation control signal according to an instruction operation code and a timing signal, to complete control of instruction fetching and execution.

The processor 110 may further include a memory configured to store instructions and data. In some embodiments, the memory in the processor 110 is a cache memory. That memory may store instructions or data most recently used or cyclically used by the processor 110. If the processor 110 needs to use the instructions or the data again, the processor 110 may directly invoke the instructions or the data from that memory. This avoids repeated access and reduces a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It can be understood that the interface connection relationship between the modules illustrated in this embodiment is merely an example for description, and does not constitute a limitation on the structure of the electronic device 100. In some other embodiments, the electronic device 100 may alternatively use an interface connection manner different from that in this embodiment or use a combination of a plurality of interface connection manners.

The charge management module 140 is configured to receive a charge input from a charger. When charging the battery 142, the charge management module 140 can also supply power to the electronic device via the power management module 141.

The power management module 141 is configured to connect the battery 142, the charge management module 140, and the processor 110. The power management module 141 receives an input from the battery 142 and/or the charge management module 140, and supplies power to the processor 110, the internal memory 121, an external memory, the display 194, the camera 193, the wireless communications module 160, and the like. In some other embodiments, the power management module 141 may alternatively be provided in the processor 110. In some other embodiments, the power management module 141 and the charge management module 140 may alternatively be provided in a same component.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may be further reused to improve the utilization of antennas. For example, the antenna 1 may be used also as a diversity antenna in a wireless local area network.

The mobile communications module 150 may provide wireless communication solutions applied to the electronic device 100 including 2G, 3G, 4G, 5G, or the like. The mobile communications module 150 may include at least one filter, a switch, a power amplifier, a low noise amplifier (low noise amplifier, LNA), and the like. The mobile communications module 150 may receive an electromagnetic wave via the antenna 1, perform processing such as filtering and amplification on the received electromagnetic wave, and transmit the processed electromagnetic wave to the modem processor for demodulation. The mobile communications module 150 may also amplify a signal modulated by the modem processor, where the amplified signal is converted by the antenna 1 to an electromagnetic wave which is radiated.

The modem processor may include a modulator and a demodulator. The modulator is configured to modulate a to-be-sent low frequency baseband signal into a medium-high frequency signal. The demodulator is configured to demodulate a received electromagnetic wave signal into a low frequency baseband signal. Then, the demodulator transmits the low frequency baseband signal obtained through demodulation to the baseband processor for processing. After being processed by the baseband processor, the low frequency baseband signal is transferred to the application processor. The application processor outputs a sound signal via an audio device (not limited to the speaker 170A, the telephone receiver 170B, or the like), or displays an image or a video via the display 194.

The wireless communications module 160 may provide wireless communication solutions applied to the electronic device 100 including wireless local area networks (wireless local area networks, WLAN) (for example, wireless fidelity (wireless fidelity, Wi-Fi) network), bluetooth (bluetooth, BT), global navigation satellite system (global navigation satellite system, GNSS), frequency modulation (frequency modulation, FM), near field communication (near field communication, NFC), infrared (infrared, IR) technology, and the like. The wireless communications module 160 may be one or more components integrating at least one communications processor module. The wireless communications module 160 receives an electromagnetic wave via the antenna 2, performs frequency modulation and filtering processing on the electromagnetic wave signal, and sends the processed signal to the processor 110. The wireless communications module 160 may also receive a to-be-sent signal from the processor 110, and perform frequency modulation and amplification on the signal, and convert, where the amplified signal is converted by the antenna 2 into an electromagnetic wave which is radiated.

In some embodiments, the antenna 1 of the electronic device 100 is coupled to the mobile communications module 150, and the antenna 2 is coupled to the wireless communications module 160, so that the electronic device 100 may communicate with a network and other devices through a wireless communication technology. The wireless communication technology may include global system for mobile communications (global system for mobile communications, GSM), general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, IR, and/or other technologies. The GNSS may include the global positioning system (global positioning system, GPS), the global navigation satellite system (global navigation satellite system, GLONASS), the BeiDou navigation satellite system (beidou navigation satellite system, BDS), the quasi-zenith satellite system (quasi-zenith satellite system, QZSS), and/or satellite based augmentation systems (satellite based augmentation systems, SBAS).

The electronic device 100 implements a display function by using the GPU, the display 194, the application processor, and the like. The GPU is a microprocessor for image processing, and is connected to the display 194 and the application processor. The GPU is configured to perform mathematical and geometric computation for graphic rendering. The processor 110 may include one or more GPUs which execute program instructions to generate or change display information.

The display 194 is configured to display images, videos, and the like. The display 194 includes a display panel. The display panel may use a liquid crystal display (liquid crystal display, LCD), light-emitting diodes (light-emitting diode, LED), organic light-emitting diodes (organic light-emitting diode, OLED), active-matrix organic light emitting diodes or active-matrix organic light emitting diodes (active-matrix organic light emitting diode, AMOLED), flex light-emitting diodes (flex light-emitting diode, FLED), mini-LEDs, micro-LEDs, micro-oLEDs, quantum dot light emitting diodes (quantum dot light emitting diodes, QLED), or the like.

The electronic device 100 may implement a shooting function by using the ISP, the camera 193, the video codec, the GPU, the display 194, the application processor, and the like. The ISP is configured to process data fed back by the camera 193. The camera 193 is configured to capture still images or videos. The digital signal processor is configured to process digital signals, including digital image signals and other digital signals. The video codec is configured to compress or decompress digital videos. The electronic device 100 may support one or more video codecs, such that the electronic device 100 is able to play or record videos in a plurality of coding formats such as moving picture experts group (moving picture experts group, MPEG) 1, MPEG2, MPEG3, and MPEG4.

There may be 1 to N cameras 193. For example, the electronic device may include 2 front-facing cameras and 4 rear-facing cameras. The front-facing cameras may include a TOF camera. The TOF camera includes a TX and an RX, where the TX may be configured to transmit light signals (infrared light or laser pulses) and the RX may be configured for receipt and imaging. The TX, for example, may be an infrared light transmitter. The RX, for example, may be a complementary metal oxide semiconductor (complementary metal oxide semiconductor, CMOS) or a charge coupled device (charge coupled device, CCD) image sensor.

Figure 2:
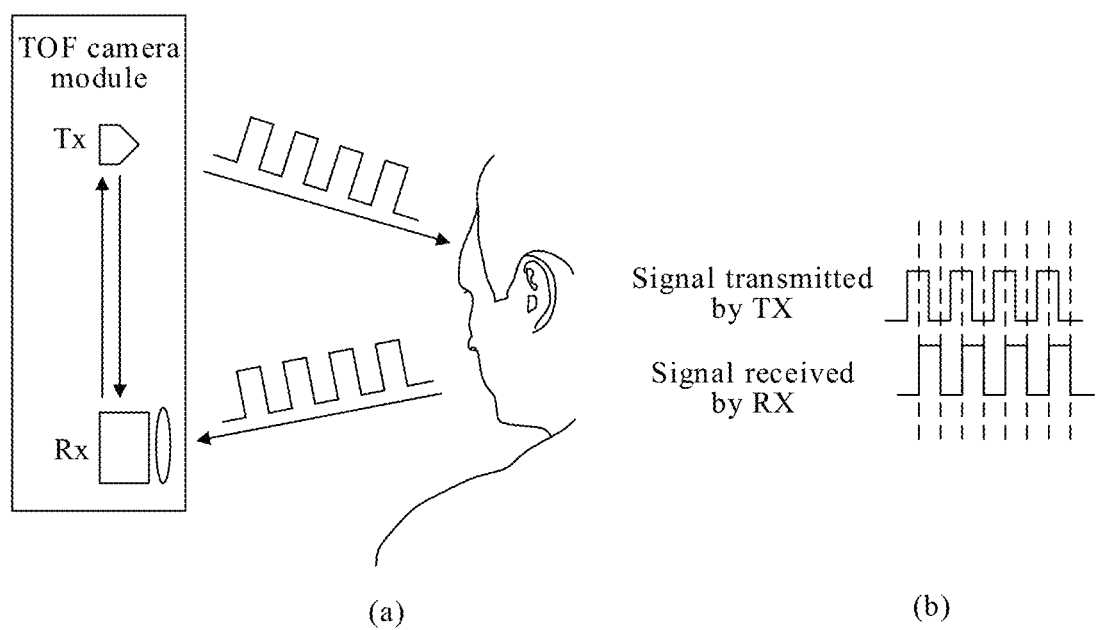
FIG. 2 is a schematic principle diagram of a TOF imaging technology according to an embodiment of this application.

For example, as shown in (a) of FIG. 2, a light transmitter (Tx) of a TOF camera may be used to continuously send light signals (infrared light or laser pulses) to a target under test (for example, a user), and a sensor side (Rx) of the TOF camera receives light signals returned by the target under test. As shown in (b) in FIG. 2, depth information of the target under test may be obtained based on a phase difference (latency) between the transmission and receipt of the light signals.

The Tx and the Rx may exchange information via a bus. For example, the Rx may send a configuration parameter to the Tx through the bus (for example, a serial peripheral interface (Serial Peripheral Interface, SPI) bus). The configuration parameter is used to indicate an address of a register corresponding to the Tx and a value specific to the register. For example, the address of the register corresponding to the Tx may be 0x11, and storage space corresponding to 0x11 may store a current value. The Tx may work at the corresponding current value based on the corresponding configuration parameter to transmit a light signal of a corresponding light intensity. The Rx may obtain corresponding image data based on reflected light of the light signal of the corresponding intensity transmitted by the transmitter. It should be noted that the Tx may transmit light signals of different light intensities when working at different current values. For example, when working at a first current value, the Tx may transmit light signals of a first light intensity; when working at a second current value, the Tx may transmit light signals of a second light intensity. The second current value is greater than the first current value. The second light intensity is higher than the first light intensity. Image data obtained by the Rx based on reflected light of light signals of different intensities is also different. For example, when the Tx transmits a light signal of the first light intensity during working at the first current value, the Rx obtains first image data within a corresponding exposure time; when the Tx transmits a light signal of the second light intensity during working at the second current value, the Rx obtains second image data within a corresponding exposure time; the second image data is different from the first image data.

When the Tx is working at a corresponding current value, the Tx may determine a working state of the Tx. The working state may be normal or abnormal. The Rx may request the working state of the Tx from the Tx via the bus, and the Tx may feed back the working state (for example, normal or abnormal) of the Tx to the Rx via the bus, so that the Rx can obtain the working state of the Tx. The Rx may encapsulate the working state of the Tx, a working state of the Rx, and working modes of the Tx and the Rx in a first packet (for example, metadata). The Rx may further encapsulate, in a second packet (for example, raw data), metadata and image data that is obtained based on reflected light.

The NPU is a neural-network (neural-network, NN) computing processor, which borrows biological neural network structures, for example, the transfer mode between human-brain neurons, to quick process input information and perform self-learning constantly. Applications such as intelligent cognition of the electronic device 100, for example, image recognition, facial recognition, speech recognition, and text understanding, can be implemented by using the NPU.

The external memory interface 120 may be configured to connect an external storage card, for example, a micro SD card, to extend a storage capacity of the electronic device 100. The external storage card communicates with the processor 110 via the external memory interface 120 to implement a data storage function. For example, files such as music and videos are stored in the external storage card. The internal memory 121 may be configured to store computer-executable program code, where the executable program code includes instructions. The processor 110 performs various function applications and data processing of the electronic device 100 by running the instructions stored in the internal memory 121. For example, in the embodiments of this application, the processor 110 may execute the instructions stored in the internal memory 121. The internal memory 121 may include a program storage area and a data storage area. The program storage area may store an operating system, an application program required by at least one function (for example, a sound play function or an image play function), and the like. The data storage area may store data (such as audio data and a phone book) created in use of the electronic device 100. In addition, the internal memory 121 may include a high-speed random access memory, and may further include a non-volatile memory, for example, at least one magnetic disk storage device, flash memory device, or universal flash storage (universal flash storage, UFS).

The electronic device 100 may implement an audio function, such as music playing or recording, by using the audio module 170, the speaker 170A, the telephone receiver 170B, the microphone 170C, the earphone jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. The speaker 170A, also referred to as a "loudspeaker", is configured to convert an audio electrical signal into a sound signal. The telephone receiver 170B, also referred to as an "earpiece", is configured to convert an audio electrical signal into a sound signal. The microphone 170C, also referred to as a "mic" or a "mike", is configured to convert a sound signal into an electrical signal. The earphone jack 170D is configured to connect a wired earphone.

The button 190 includes an on/off button, a volume button, or the like. The button 190 may be a mechanical button, or a touch button. The electronic device 100 may receive a button pressing input, and generate a key signal input related to user setting or function control of the electronic device 100. The motor 191 may generate a vibration alert. The motor 191 may be configured to generate a vibration alert for an incoming call, and may also be configured to feed back a touch vibration. The indicator 192 may be an indicator light, may be configured to indicate a state of charge or a change of power level, and may also be configured to indicate a message, a missed call, a notification, or the like. A SIM card interface 195 is configured to connect a SIM card. The SIM card may be inserted into the SIM card interface 195 or pulled out from the SIM card interface 195, to come into contact with or separate from the electronic device 100. The electronic device 100 may support 1 or N SIM card interfaces, where N is a positive integer greater than 1. The SIM card interface 195 may support a nano SIM card, a micro SIM card, a SIM card, or the like.

Methods in the following embodiments may all be implemented in the electronic device 100 with the foregoing hardware structure.

A software system of the electronic device 100 may adopt a layered architecture, an event-driven architecture, a micro-kernel architecture, a microservice architecture, or a cloud architecture. In this embodiment of the present invention, the software structure of the electronic device 100 is described by using an Android system with a layered architecture as an example.

A layered architecture divides software into several layers, and each layer has a clear role and responsibility. The layers communicate with each other through interfaces. In some embodiments, the Android system may include an application layer, an application framework layer, Android runtime (Android runtime) and system libraries, a hardware abstraction layer (hardware abstraction layer, HAL), and a kernel layer. It should be noted that this embodiment of this application is described with the Android system as an example; in other operating systems (such as a HarmonyOS system or an IOS system), the solutions in this application can also be implemented provided that functions implemented by function modules are similar to those in the embodiments of this application.

The application layer may include a series of application packages.

Figure 3:
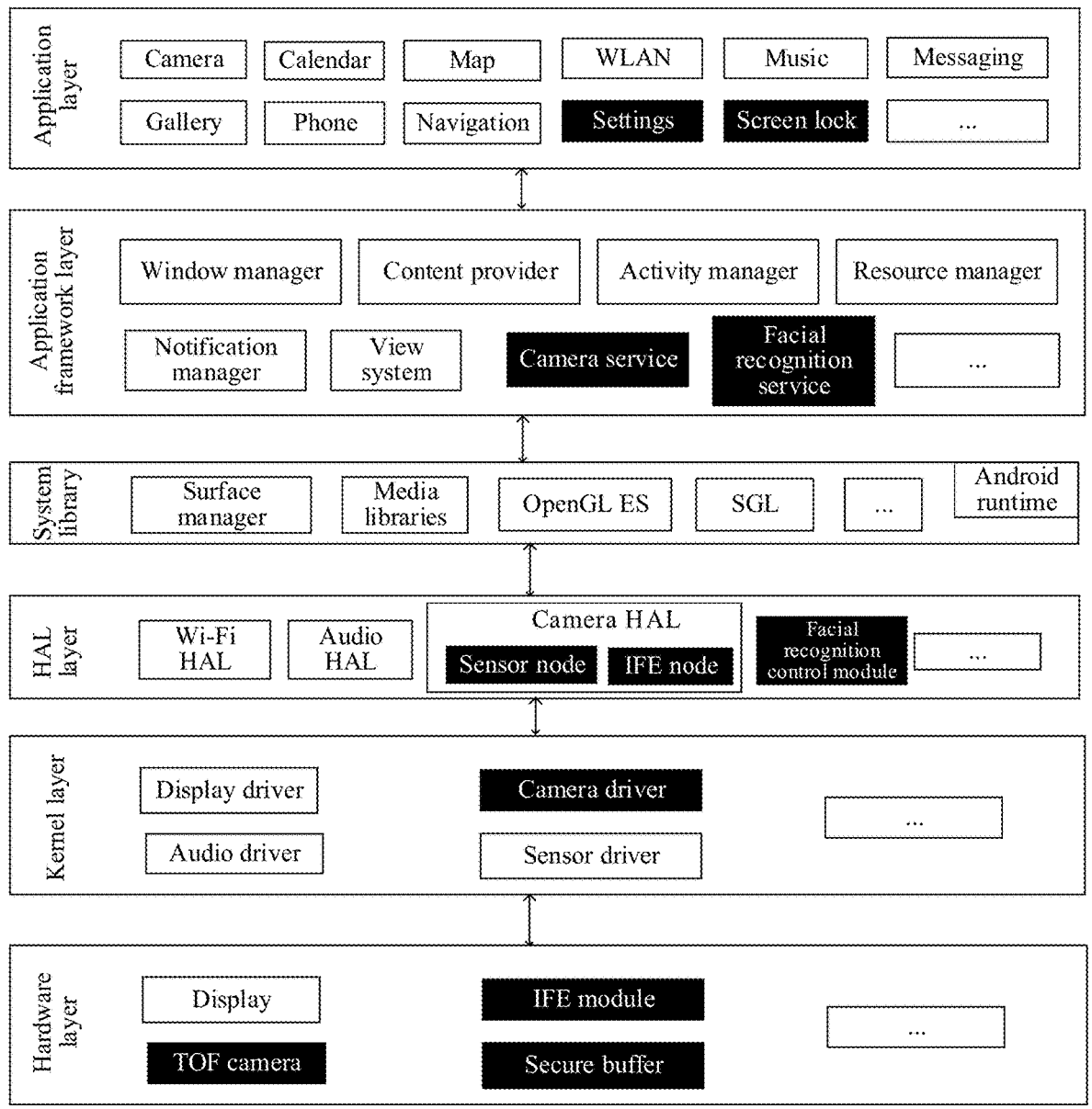
FIG. 3 is a schematic diagram of a software module architecture according to an embodiment of this application.

As shown in FIG. 3, the application packages may include application programs such as camera, gallery, calendar, phone, map, navigation, WLAN, Bluetooth, music, video, messaging, screen lock, and settings. Certainly, the application layer may also include other application packages, for example payment, shopping, bank, chat, or wealth management applications. This is not limited in this application.

The settings application has a function of face enrollment, where an enrolled face is used for face unlock. The screen lock application has a function of performing unlock in response to an unlock operation (for example, pressing a power button) by a user. The screen lock application may perform unlock processing such as face unlock, fingerprint unlock, or password unlock. The embodiments of this application mainly use face unlock as an example for description.

The application framework layer provides application programming interfaces (application programming interface, API) and a programming framework for application programs at the application layer. The application framework layer includes some predefined functions. For example, the application framework layer may include an activity manager, a window manager, a content provider, a view system, a resource manager, a notification manager, a camera service (Camera Service), and a facial recognition service. This is not limited in this embodiment of this application.

The system libraries may include a plurality of function modules, such as a surface manager (surface manager), media libraries (Media Libraries), OpenGL ES, and SGL.

The surface manager is configured to manage a display subsystem, and provides blending of 2D and 3D graphic layers for a plurality of application programs.

The media libraries support playback and recording of audio and videos in a plurality of commonly used formats, static image files, and the like. The media libraries may support a plurality of audio and video encoding formats such as MPEG4, H.264, MP3, AAC, AMR, JPG, and PNG.

The OpenGL ES is configured to implement three-dimensional graphic drawing, image rendering, synthesis, layer processing, and the like.

The SGL is a drawing engine for 2D drawing.

The Android runtime (Android Runtime) includes core libraries and a virtual machine. The Android runtime is responsible for scheduling and management of the Android system. The core libraries include two parts: One is functional functions that need to be called by a Java language, and the other is Android core libraries. The application layer and the application framework layer run on the virtual machine. The virtual machine executes java files of the application layer and the application framework layer as binary files. The virtual machine is configured to perform functions such as object lifecycle management, stack management, thread management, security and exception management, and garbage collection.

The HAL layer is an encapsulation of Linux kernel drivers, which provides an upward interface while screening implementation details of low-layer hardware.

The HAL layer may include a Wi-Fi HAL, an audio (audio) HAL, a camera HAL (Camera HAL), a facial recognition control module (Face CA), and the like.

The camera HAL is a core software framework of cameras. The camera HAL may include a sensor node (sensor node) and an image front end (image front end, IFE) node (IFE node). The sensor node and the IFE node are components (nodes) in transmission paths (which may also be referred to as transmission pipelines) created by the camera HAL for image data and control instructions.

The facial recognition control module is a core software framework/application for facial recognition.

Face trusted application (Face Trusted Application, Face TA): an application running in a TEE environment and used for facial recognition. In the embodiments of this application, face TA is referred to as a TA for face recognition.

The kernel layer is a layer between hardware and software. The kernel layer includes at least a display driver, a camera driver, an audio driver, and a sensor driver.

The camera driver is a driver layer of a camera device and is mainly responsible for interaction with the hardware.

A hardware layer includes a display, a TOF camera, an IFE module, a secure buffer (Secure Buffer), and the like.

The secure buffer is a buffer with a security protection function and may be configured to store raw data collected by the TOF camera.

The TOF camera, which may also be referred to as a TOF sensor (TOF sensor), may include a transmitter (TX) and a receiver (RX). The TX is configured to transmit infrared light or laser pulses, and the RX is configured to receive reflected light and make images.

The IFE module (IFE-Lite) may be referred to as an image front end module, and may be configured to forward image data, without processing the image data during a forwarding process.

Figure 4:
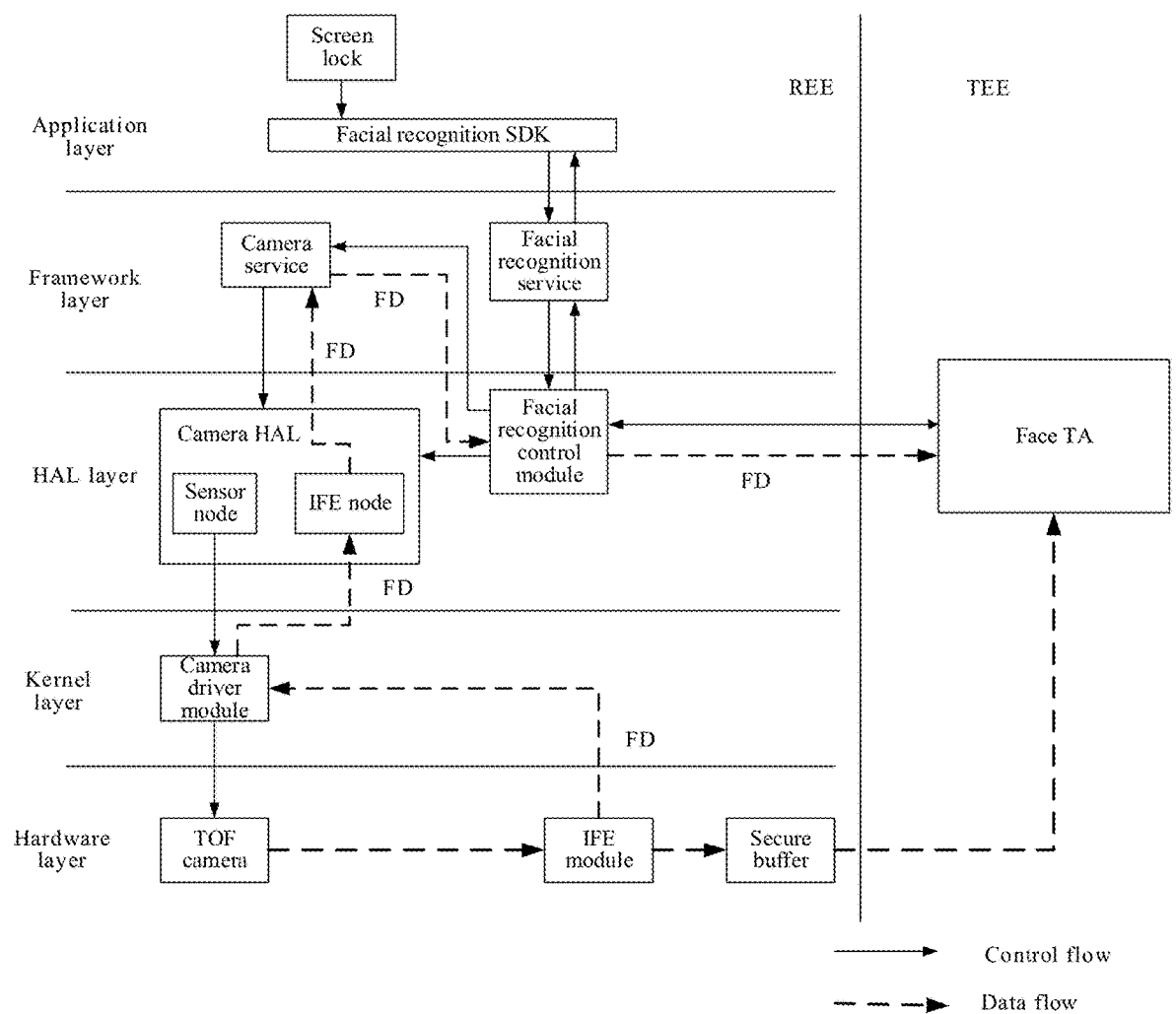
FIG. 4 is a schematic diagram of interaction between software modules according to an embodiment of this application.

The following describes software modules used in the facial recognition method provided in the embodiments of this application, and interactions between the modules. As shown in FIG. 4, a screen lock application at an application layer may interact with a facial recognition SDK. The facial recognition SDK may interact with a facial recognition service at a framework layer by invoking a preset application programming interface (application programming interface, API). The facial recognition service may interact with a facial recognition control module at an HAL layer. The facial recognition control module may interact with a camera HAL at the HAL layer through a camera service at the framework layer, or the facial recognition control module may directly interact with the camera HAL at the HAL layer. The camera HAL may include a sensor node and an IFE node. The sensor node may interact with a camera driver module at a kernel layer. The camera driver module may be configured to drive a TOF camera at a hardware layer to collect image data in a default working mode (for example, an eye-safe mode, details of which are given in the description of S112 below). An IFE module may save, into a secure buffer, the image data collected by the TOF camera. A storage location, of the image data collected by the TOF camera, in the secure buffer may be represented by using a file descriptor (file descriptor, FD). The IFE module may send an FD of the image data to the camera driver module. The camera driver module may transfer the FD to the IFE node of the camera HAL. The IFE node may transfer the FD to the camera service. The camera service may transfer the FD to the facial recognition control module. The facial recognition control module may transfer the FD to a face TA. The face TA may fetch the image data from the secure buffer according to the FD and process the image data, and may send a processing result to the facial recognition control module. The facial recognition control module may continue to interact with the camera HAL through the camera service to switch between working modes of the TOF camera. The camera HAL may continue to interact with the camera driver module so that the camera driver module may drive the TOF camera to collect image data in a switched-to working module (for example, face ID mode, details of which are given in the description of S112 below). An FD corresponding to the image data may continue to be transferred to the face TA through the IFE module, the camera driver module, the IFE node, the camera service, and the face control module. The face TA may again fetch and process the image data, and feed back a processing result (facial recognition success or facial recognition failure) to the facial recognition control module. The facial recognition control module may feed back the processing result to the screen lock application through the facial recognition service and the facial recognition SDK, so that the screen lock application determines whether to perform unlock (if facial recognition succeeds, perform unlock; if facial recognition fails, skip unlock, which means unlock fails). In FIG. 4, arrows with solid lines may be used to represent control flows, and arrows with dashed lines may be used to represent data flows.

Figure 5:
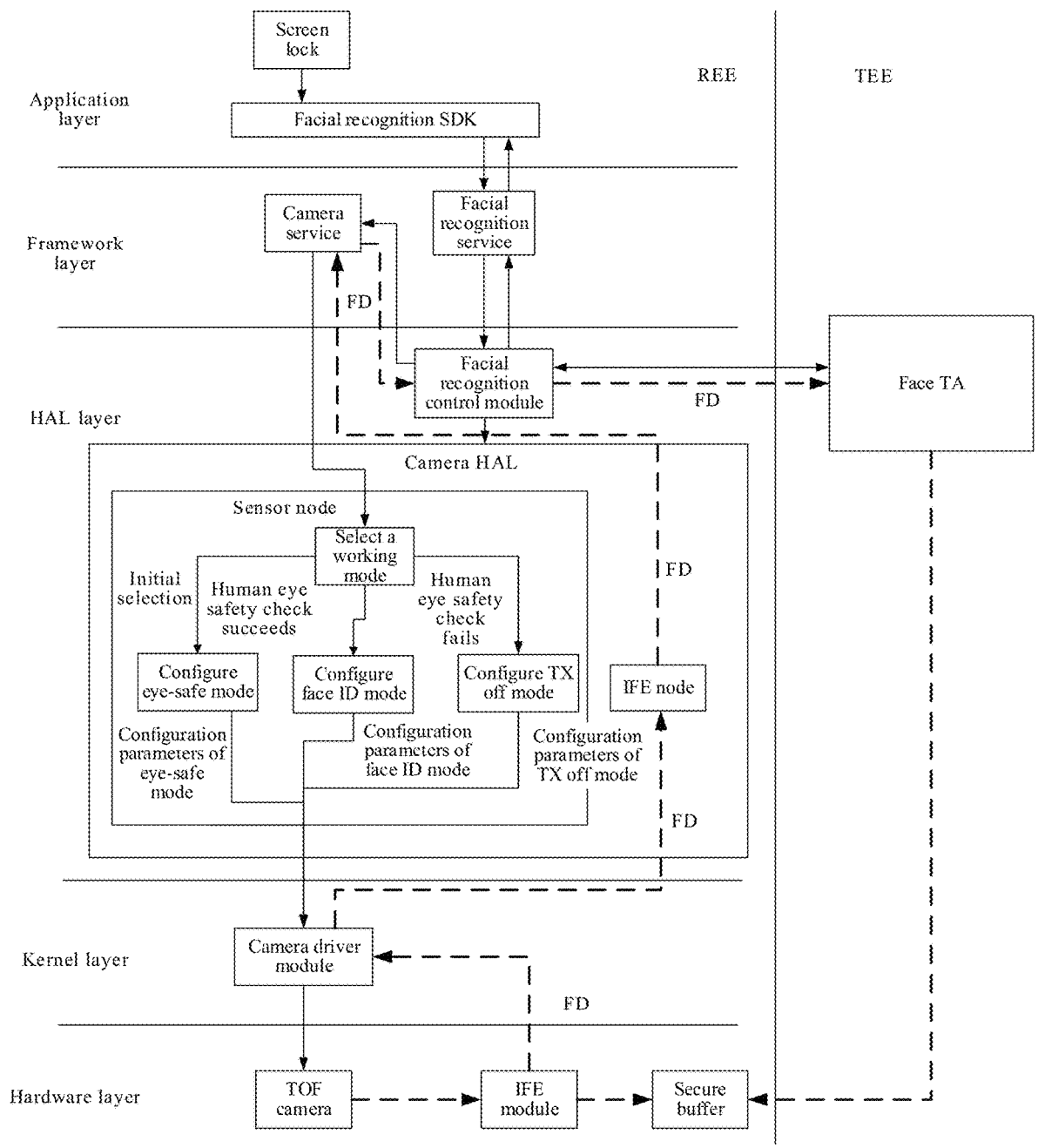
FIG. 5 is another schematic diagram of interaction between software modules according to an embodiment of this application.
Figure 6A:
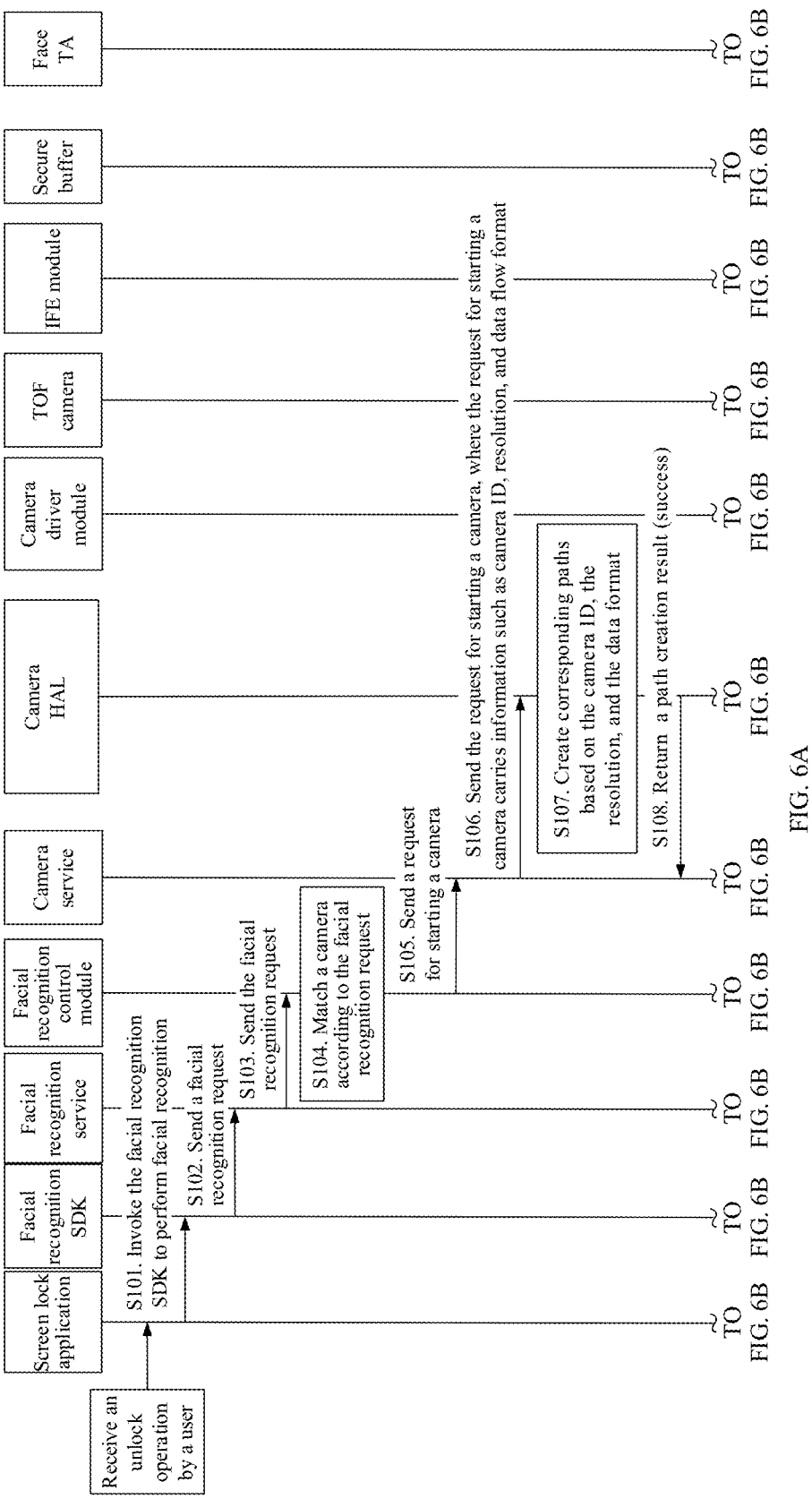
Figure 6C:
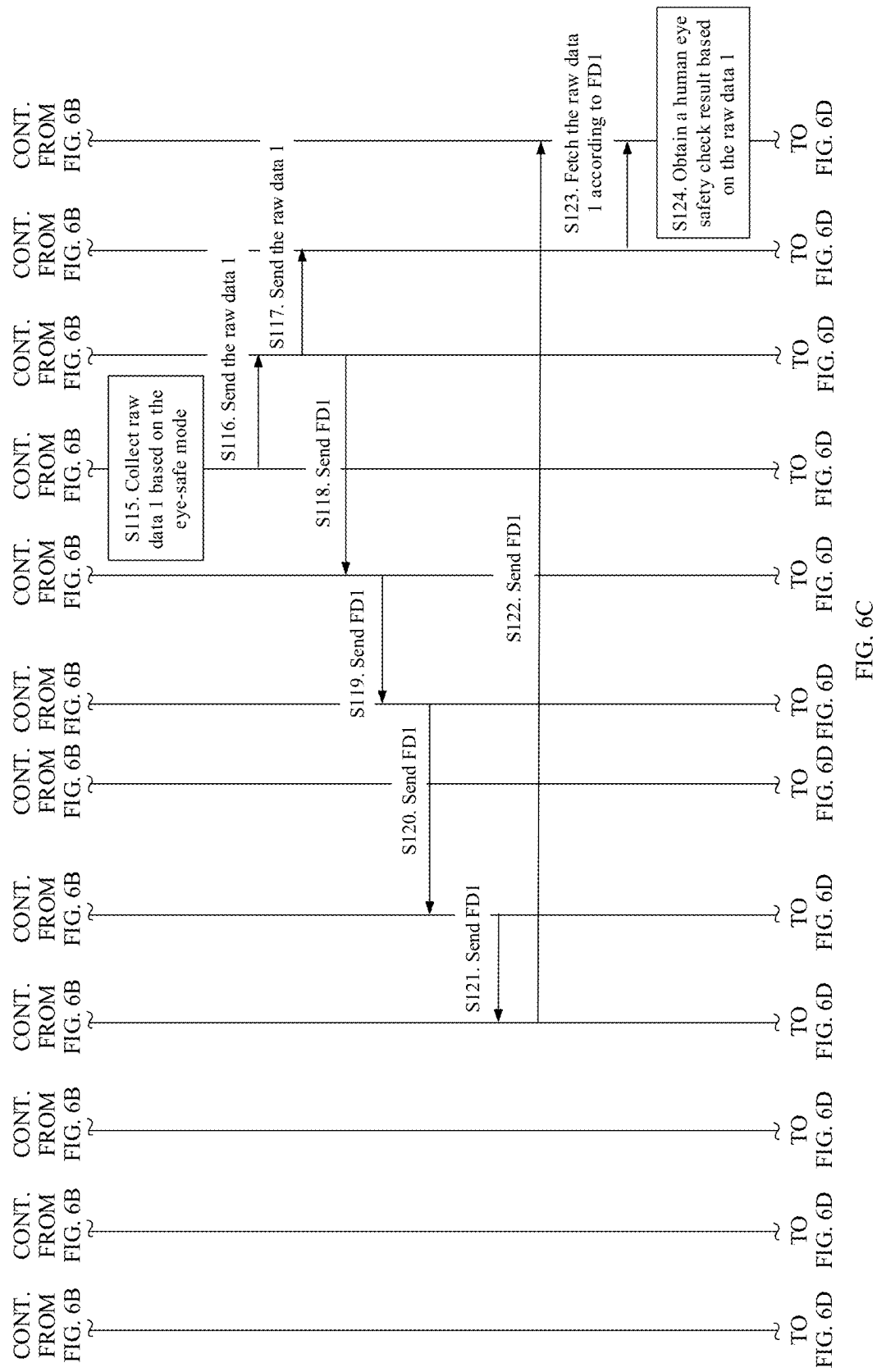
Figure 6D:
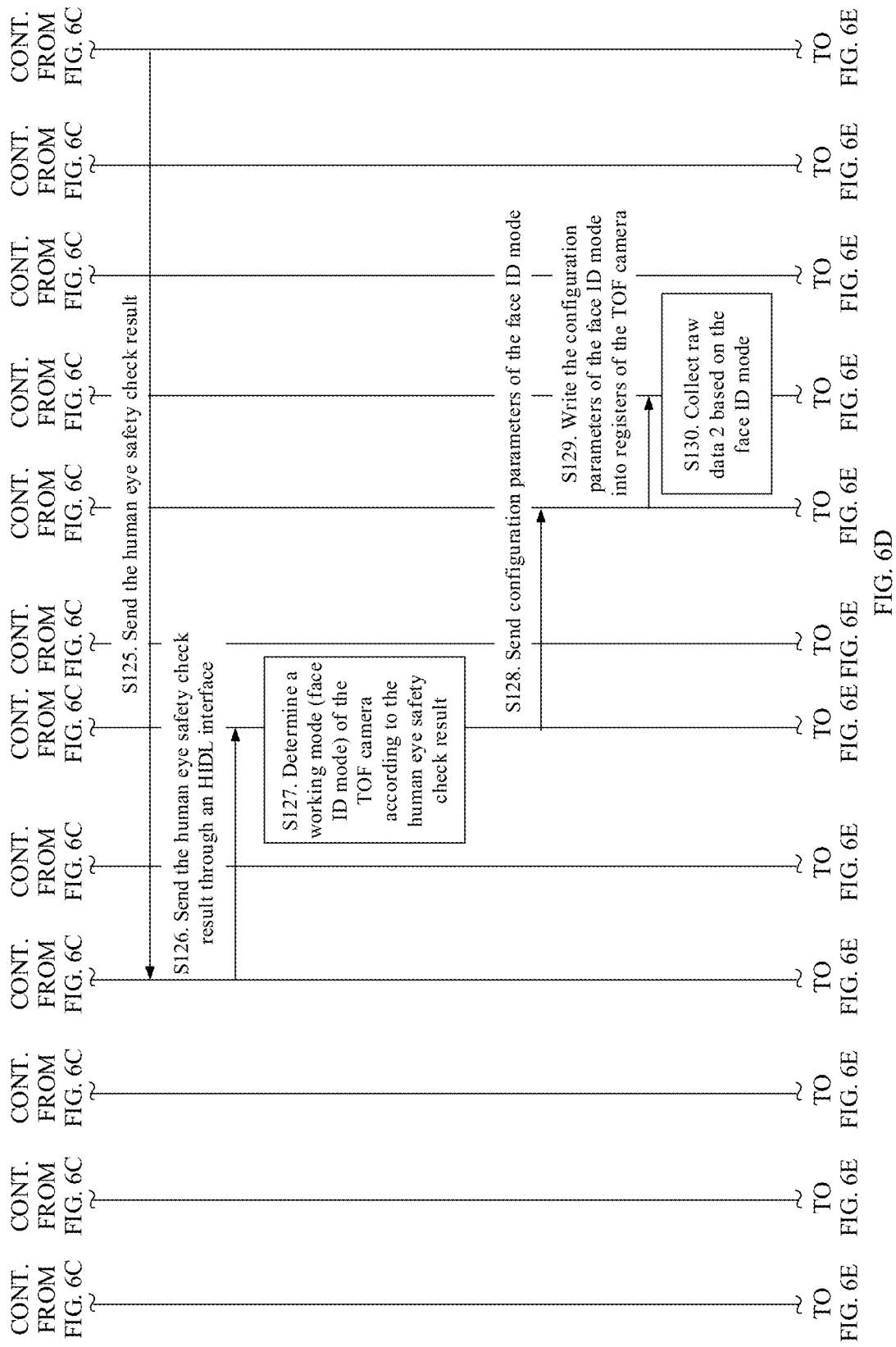
Figure 6E:
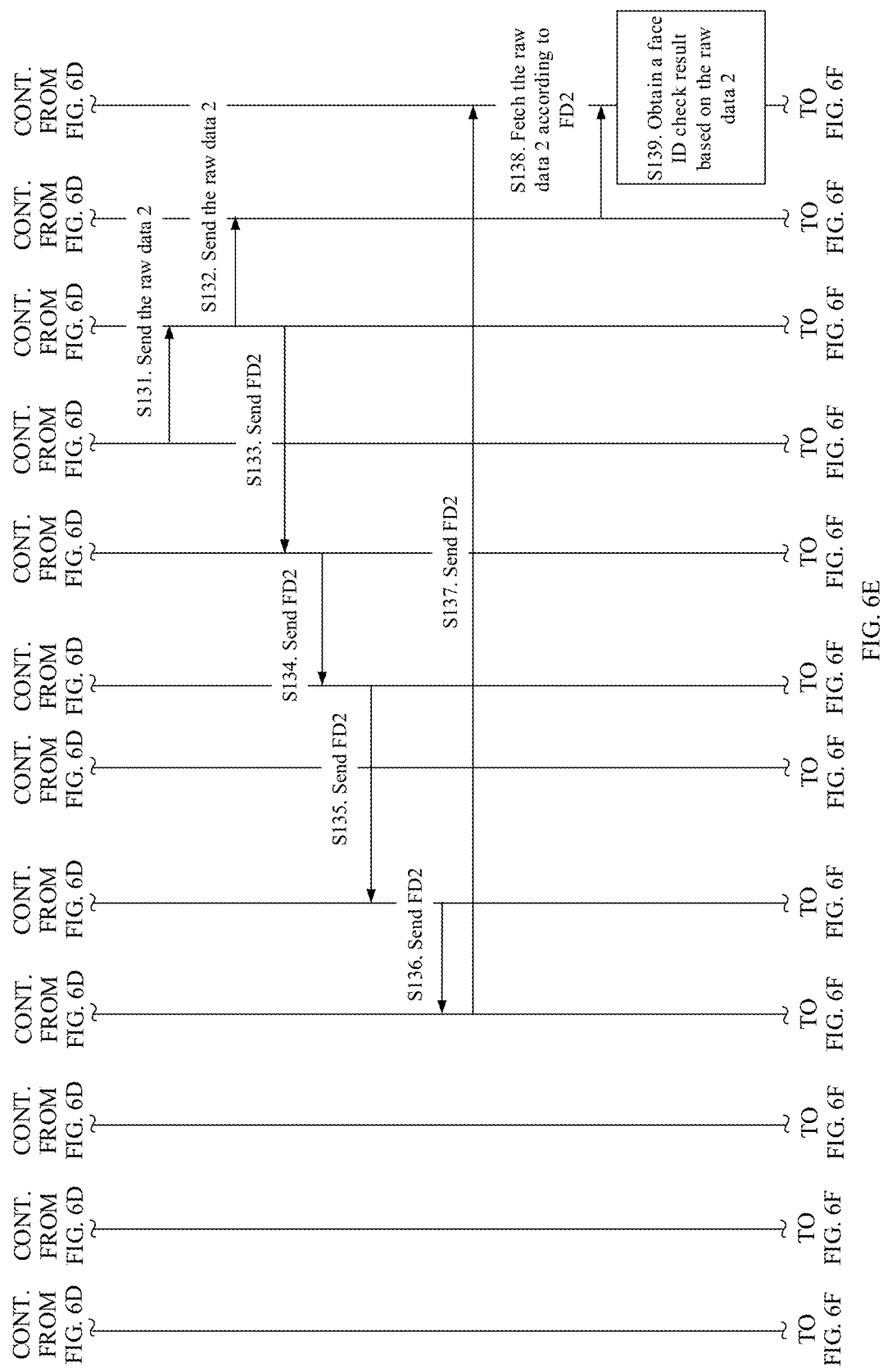
Figure 6F:
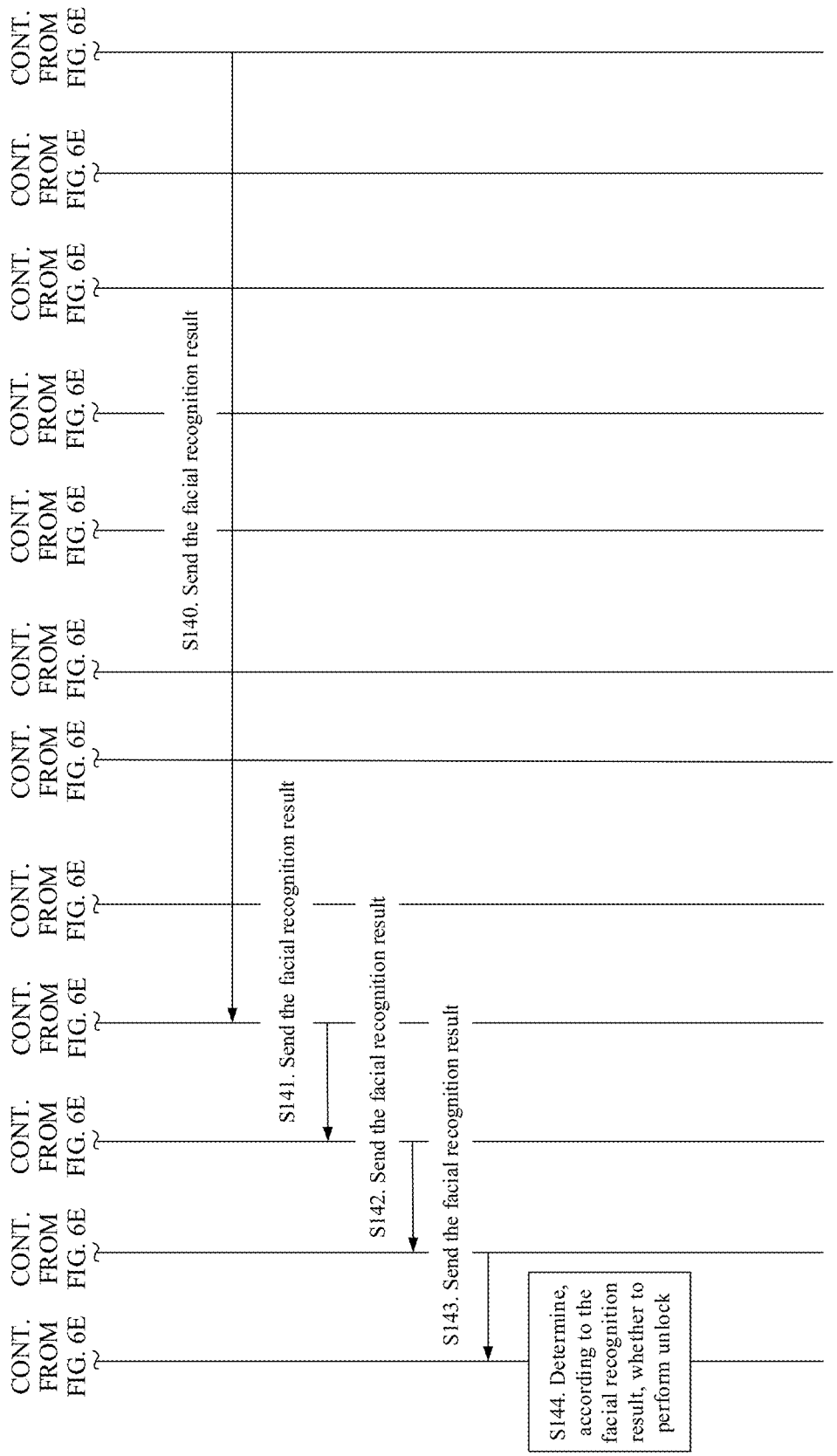

Specifically, as shown in FIG. 5, the sensor node in the camera HAL may be configured to select a working mode of the TOF camera, including an eye-safe mode (first working mode), a face ID mode (second working mode), a TX off mode (third working mode), or the like. For details about the working modes, reference may be made to the description of S112 below. A default initial working mode of the TOF camera may be the eye-safe mode. When working in the eye-safe mode, the TOF camera may fetch, from a memory, an eye-safe current value (a first current value) specified by a production line and update an eye-safe mode configuration according to the current value, and may send configuration parameters of the eye-safe mode to the camera driver module. After a human eye safety check result is obtained, mode switching processing may be performed. Specifically, if the human eye safety check result is success, the TOF camera may switch to the face ID mode; if the human eye safety check result is failure, the TOF camera may switch to the TX off mode. In this way, human eye safety can be ensured.

For ease of understanding, the following specifically describes, with reference to the accompanying drawings, the method provided in the embodiments of this application.

As shown in FIG. 6A to FIG. 6F, an embodiment of this application provides a TOF image based method for human eye safety check and facial recognition, for which a procedure is as follows.

S101. A screen lock application invokes a facial recognition SDK to perform facial recognition.

When detecting an unlock operation (a first operation) by a user, the screen lock application invokes the facial recognition SDK to perform facial recognition. The unlock operation by the user includes a user operation such as picking up a mobile phone, or pressing a power button, or performing an operation on a screen (tapping, sliding, or the like), or pulling out a charging cable.

In addition, the screen lock application may register a callback with the facial recognition SDK. A purpose of registering the callback is to return to the screen lock application a facial recognition result that is obtained by the facial recognition SDK.

S102. The facial recognition SDK sends a facial recognition request to a facial recognition service.

The facial recognition request carries a facial recognition type identifier, an image resolution, and a data flow format. Facial recognition types include a 2D facial recognition type (for example, may correspond to an identifier 0) and a 3D facial recognition type (for example, may correspond to an identifier 1).

For example, the facial recognition request may carry a facial recognition type of 1 (which is the 3D facial recognition type), an image resolution of 1280×2898 pixels (pixel), and a data flow format of raw image format (raw image format, RAW) 16.

In addition, the facial recognition SDK may register a callback with the facial recognition service. A purpose of registering the callback is to return to the facial recognition SDK a face recognition result that is obtained by the facial recognition service.

S103. The facial recognition service sends the facial recognition request to a facial recognition control module.

For the facial recognition request, reference may be made to the description of S102. Details are not described herein again.

In other words, the facial recognition SDK may notify, through the facial recognition service, the facial recognition control module to perform the facial recognition. The facial recognition service may send, to the facial recognition control module, the facial recognition request received from the facial recognition SDK.

In addition, the facial recognition service may register a callback with the facial recognition control module. A purpose of registering the callback is to return to the facial recognition service a face comparison result that is obtained by the facial recognition control module.

S104. In response to receiving the facial recognition request, the facial recognition control module matches a camera according to the facial recognition request.

Specifically, the facial recognition control module may obtain the facial recognition type identifier, the image resolution, and the data flow format from the facial recognition request, and determine the matching camera by querying a camera service about camera capabilities.

It should be understood that during a process of switching on an electronic device, the camera service may send a camera capability query request to a camera HAL. The camera capability query request is used to request a query of camera capabilities supported by the electronic device. After receiving the camera capability query request, the camera HAL may send the camera capabilities supported by the electronic device to the camera service. The camera service may store the received camera capabilities supported by the electronic device. The camera capabilities supported by the electronic device include its cameras' camera identities (identity, ID), supported maximum resolutions, and data flow formats, whether the cameras support depth information collection, and the like.

For example, it is assumed that three cameras are installed in a mobile phone. Capability information of the three cameras may be as given in Table 1.

TABLE 1

| Camera ID | Mounting position | Supported maximum resolution | Data flow format | Depth information |
|---|---|---|---|---|
| 1 | Rear-facing | 4096 × 3072 pixels | YUY | No |
| 2 | Front-facing | 3264 × 2448 pixels | YUY | No |
| 3 | Front-facing | 1280 × 2898 pixels | RAW16 | Yes |

A camera whose camera ID is 3 may be a TOF camera which supports collection of depth information. Cameras whose camera IDs are 1 and 2 may be common cameras which do not support collection of depth information. Certainly, more front-facing or rear-facing cameras may be installed in a mobile phone. For example, 2 front-facing cameras and 4 rear-facing cameras may be installed in a mobile phone.

The facial recognition control module may send a camera capability query request to the camera service. The camera service may send the camera capabilities supported by the electronic device to the facial recognition control module. The facial recognition control module may determine the matching camera according to the camera capabilities supported by the electronic device. For example, it may be determined that the matching camera is the camera whose ID is 3 (that is, the TOF camera).

It should be noted that Table 1 is only an example. Each camera may correspond to a plurality of data flow formats. For example, the camera whose camera identity is 1 may correspond to not only a data flow format of YUY but also a data flow format of RAW16. This is not limited in this application.

S105. The facial recognition control module sends, to the camera service, a request for starting a camera (Camera).

For example, the facial recognition control module may send, to the camera service through a vendor native development kit (vendor native development kit, VNDK) interface, the request for starting a camera. The request for starting a camera carries information such as security flag, camera ID, resolution, and data flow format. The security flag is used to indicate storing data in a secure buffer. To be specific, the security flag may be used for requesting a secure buffer, which is later used to store data collected by the camera. For example, the security flag may be 1 or 0, where 1 means storing data in a secure buffer and 0 means storing data in a non-secure buffer.

For example, the request for starting a camera may carry a security flag of 1 (indicating data is to be stored in a secure buffer), an image resolution of 1280×2898 pixels, a data flow format of RAW16, and a camera ID of 3.

In addition, the facial recognition control module may register a callback with the camera service. Registering the callback is to notify, after the camera service finishes starting a camera, the facial recognition control module that camera starting is complete.

S106. In response to receiving the request for starting a camera, the camera service sends, to the camera HAL, the request for starting a camera, where the request for starting a camera carries the information such as security flag, camera ID, resolution, and data flow format.

During a process of the camera service invoking the camera HAL, the camera service may send the information such as security flag, camera ID, image resolution, and data flow format to the camera HAL. The camera HAL may buffer the information such as security flag, camera ID, image resolution, and data flow format for a preset period of time.

In addition, the camera service may register a callback with the camera HAL. The callback is used for the camera HAL to notify a path creation result to the camera service.

S107. The camera HAL creates corresponding paths based on the camera ID, the image resolution, and the data flow format.

The camera HAL may select available nodes based on the camera ID, the resolution, and the data flow format, and then create the corresponding paths based on the available nodes. For example, if the resolution is 1280×2898 pixels, the data flow format is RAW16, and the camera ID is 3, it may be determined to select a sensor node and an IFE node. This is because the sensor node and the IFE node may support transmission of data, with a resolution of 1280×2898 pixels and with a data flow format of RAW16, that is collected by the camera with the camera ID of 3.

A path corresponding to the sensor node may be the path: sensor node—camera driver—TOF camera—IFE module—secure buffer. A path corresponding to the IFE node may be the path: IFE module (carrying FD)—camera driver—IFE node. The camera HAL may connect, at an HAL layer, an output port of the sensor node and an input port of the IFE node. Thus, the path corresponding to the sensor node and the path corresponding to the IFE node may form a closed-loop path. After path creation is complete, hardware in the paths is powered on (that is, a hardware circuit is energized), waiting for data requests.

S108. The camera HAL returns the path creation result to the camera service.

The path creation result may be success or failure. If the path creation result is failure, the camera HAL notifies the camera service that path creation fails. If the path creation result is success, the camera HAL notifies the camera service that path creation is successful and S109 and subsequent steps may continue to be performed.

S109. In response to receiving a notification of successful path creation, the camera service returns, to the facial recognition control module, a message indicating that camera starting is complete.

It can be understood that camera starting being complete means that preparation work (for example, camera parameter configuration, energization, and other preparation work) is complete for the camera to take a photo or video.

S110. In response to receiving the message indicating that camera starting is complete, the facial recognition control module sends a data request to the camera service.

The data request is used to request to obtain a data flow of the camera.

S111. In response to receiving the data request sent by the facial recognition control module, the camera service invokes the camera HAL to obtain the data flow.

S112. The camera HAL selects a camera working mode via the sensor node.

Specifically, the sensor node may select, based on the camera resolution and the data flow format that are buffered in S106, a camera working mode corresponding to the sensor node. For example, the sensor node may select, by looking up in a table (for example, Table 2), the camera working mode corresponding to the sensor node.

TABLE 2

| Resolution (maximum) | Data flow format | Camera working mode |
|---|---|---|
| 1280 × 2898 pixels | Raw | Eye-safe mode, face ID mode, TX off mode |
| 640 × 480 pixels | Depth | Face ID mode |

The eye-safe mode (EyeSafe Mode) is a mode where a Tx of the TOF camera works under a small current (a current less than a preset threshold, a first current value). The eye-safe mode is used to check whether the TOF camera is damaged. The face ID mode (Face ID Mode) is a mode where a Tx of the TOF camera works at a normal current (a second current value in a preset threshold range). The face ID mode is used for scenarios such as secure face unlock, and secure payment. The second current value is greater than the first current value. The TX off mode (Tx OFF Mode) is a mode where a Tx of the TOF camera is not energized (therefore is not transmitting light). The TX off mode is used when it is detected that a Tx component of the TOF camera is damaged or unable to work properly. This is because if the Tx component is still energized and used when being damaged, adverse impact may be made on a human eye. Therefore, when it is detected that the Tx component of the TOF camera is damaged, the TX off mode is used to cut off the power of the Tx component, so as to avoid injuring a human eye.

Certainly, more camera working modes may further be included. This is not limited in this application.

It can be learned from Table 2 that when the maximum value of the image resolution is 1280×2898 pixels and the data flow format is RAW, the camera working modes may include the eye-safe mode, the face ID mode, the TX off mode, and the like. The sensor node may default an initial camera working mode to the eye-safe mode. When the camera working mode is the eye-safe mode, the sensor node may fetch, from a memory (for example, oeminfo), an eye-safe current value specified by a production line (that is, a current value harmless to human eyes), and update an eye-safe mode setting (setting) of the TOF camera according to the eye-safe current value. For example, an address of a current register of the TOF camera may be obtained through table lookup, and the eye-safe current value is written into the current register of the TOF camera. It should be understood that the sensor node may store addresses of registers of the TOF camera, and the addresses of the registers of the TOF camera may be as shown in Table 3.

TABLE 3

| Register identifier | Type of stored data | Address |
|---|---|---|
| 1 | Current | 0 × 1 |
| 2 | Resolution | 0 × 2 |
| 3 | Data flow format | 0 × 3 |

TABLE 3-continued

| Register identifier | Type of stored data | Address |
| --- | --- | --- |
| 4 | Working state of TOF camera device | 0 × 4 |
| 5 | Working mode of TOF camera | 0 × 5 |

For example, by querying Table 3, it can be determined that the address of the register corresponding to current is 0x1, so that an eye-safe current value may be written into a storage space corresponding to 0x1.

S113. The sensor node sends configuration parameters of the eye-safe mode to a camera driver (Camera Driver) module of a kernel layer.

For example, the configuration parameters of the eye-safe mode may be a current value of 700 mA, an IR greyscale image exposure time of 10 μs, and a depth image exposure time of 10 μs.

S114a. The camera driver module writes (updates) the configuration parameters of the eye-safe mode into registers of the TOF camera.

In other words, the camera driver module may send the configuration parameters of the eye-safe mode to the TOF camera.

For example, the camera driver module may write the configuration parameters of the eye-safe mode into registers of the RX of the TOF camera through an inter-integrated circuit (inter-integrated circuit, I2C). An address corresponding to a register of the RX may be 0x01. The RX may correspond to a plurality of registers. This is not limited in this application. In other words, the configuration parameters of the eye-safe mode may be sent to the RX of the TOF camera through I2C. The configuration parameters of the eye-safe mode include configuration parameters specific to the RX and the TX. For example, the configuration parameter specific to the TX may be the first current value, and the configuration parameter specific to the RX may be an exposure time. The RX may write, through an SPI bus, the configuration parameters corresponding to the TX into registers corresponding to the TX. An address of a register corresponding to the TX may be 0x11. The TX may correspond to a plurality of registers. This is not limited in this application.

S114b. The camera driver module sends a stream on (stream on) command/instruction (second stream on command) to the TOF camera.

The stream on command is used to drive the TOF camera to collect data.

It should be noted that before S114b and after S114a, the camera driver module may further send, to the sensor node, a message indicating that writing the configuration parameters is complete. In response to receiving the message indicating that writing the configuration parameters is complete, the sensor node sends a stream on command (first stream on command) to the camera driver module.

S115. In response to receiving the stream on command, the TOF camera collects raw data 1 based on the eye-safe mode.

Specifically, in response to receiving the stream on command, the RX may send, to the TX, a request for transmitting a light signal. The TX sends a light signal of a first light intensity when working at a corresponding current value (first current value). The RX receives the light signal within a corresponding exposure time (exposure value, for example, 10 us). The light signal received by the RX includes reflected light of the light signal of the first light intensity. Based on the received light signal, the RX obtains first image data.

In other words, the raw data 1 (raw data 1) is image data (the first image data) obtained by the Rx of the TOF camera by receiving the reflected light and forming an image when the Tx of the TOF camera transmits the light signal to a face during working at the eye-safe current value calibrated by the production line. A light signal transmitted by the Tx working at the eye-safe current value calibrated by the production line has the first light intensity.

The RX may further obtain a working state from the TX through the SPI bus. Then, the TX may return the working state of the TX to the RX. After the RX receives the working state sent by the TX, the RX may obtain the working state of the TOF camera device, including the working state of the TX and a working state of the RX.

Raw data includes metadata. For example, the metadata stores information such as a current working mode (for example, the eye-safe mode) of the TOF camera, a lighting current value (for example, the eye-safe current value specified by the production line), the working state of the TOF camera device (for example, normal or abnormal), and an image exposure value (for example, 10 μs).

S116. The TOF camera sends, to the IFE module, the raw data 1 collected based on the eye-safe mode.

For example, the TOF camera may send, to the IFE module through a mobile industry processor interface (mobile industry processor interface, MIPI), the raw data 1 collected by the TOF camera. The IFE module may also be referred to as an image front end module (IFE-Lite). The IFE module may not process the raw data 1.

S117. The IFE module sends the raw data 1 to a secure buffer (Secure Buffer) for storage.

A storage location, of the raw data 1 collected by the TOF camera based on the eye-safe mode, in the secure buffer may be represented by using an FD1.

For example, FD1 being 69 may indicate that the storage location is an XX secure buffer; FD1 being 96 may indicate that the storage location is a YY non-secure buffer (a common buffer).

S118. The IFE module sends the FD1 to the camera driver module.

S119. The camera driver module sends the FD1 to the IFE node.

S120. The IFE node sends the FD1 to the camera service through an interface of the camera HAL.

S121. The camera service sends the FD1 to the facial recognition control module.

S122. The facial recognition control module sends the FD1 to the face TA (FACE TA).

The face TA includes a TOF algorithm and a face ID algorithm. The TOF algorithm is used to convert raw data into a greyscale image and a depth image, and compute, based on the greyscale image and the depth image, whether a face is secure (that is, whether a current user is an owner of the electronic device). The face ID algorithm is used to perform matching based on the greyscale image and perform anti-counterfeiting determining based on the depth image.

S123. The face TA fetches the raw data 1 from the secure buffer according to the FD1.

The face TA may request the raw data 1 from the secure buffer according to the FD1. The secure buffer sends the raw data 1 to the face TA.

S124. The face TA obtains a human eye safety check result based on the raw data 1.

Specifically, the face TA may process metadata in the raw data 1 by using the TOF algorithm, to obtain the human eye safety check result.

First, whether the TOF camera is in the eye-safe working mode may be determined based on the metadata. If yes (that is, the TOF camera works in the eye-safe working mode), whether a device working state is normal is determined. If the device is working in a normal state, the human eye safety check result is safe/normal (or the human eye safety check succeeds). If the device is working in an abnormal state, the human eye safety check result is unsafe/abnormal (or the human eye safety check fails).

S125. The face TA sends the human eye safety check result to the facial recognition control module.

S126. The facial recognition control module sends the human eye safety check result to the camera HAL.

In a possible design, if the human eye safety check result is safe/normal (or the human eye safety check succeeds), the facial recognition control module sends the human eye safety check result to the camera HAL, and the camera HAL determines a corresponding working mode according to the human eye safety check result (see S127). If the human eye safety check result is unsafe (abnormal), the facial recognition control module may consider that the facial recognition fails. The facial recognition control module may transfer the facial recognition result (failure) to the facial recognition service based on the callback previously (in S103) registered by the facial recognition service. The facial recognition service transfers the facial recognition result (failure) to the facial recognition SDK based on the callback previously (in S102) registered by the facial recognition SDK. The facial recognition SDK transfers the facial recognition result (failure) to the screen lock application based on the callback previously (in S101) registered by the screen lock application. The screen lock application may determine, according to the facial recognition result (failure), not to perform unlock.

In another possible design, the facial recognition control module may directly send the human eye safety check result to the camera HAL (whether the human eye safety check result is success or failure), and the camera HAL determines a corresponding working mode according to the human eye safety check result (see S127).

For example, the facial recognition control module may directly transfer the human eye safety check result to the camera HAL through an HAL interface definition language (HAL interface definition language, HIDL) interface. Alternatively, the facial recognition control module may send the human eye safety check result to the camera service through a VNDK interface, so that the camera service sends the human eye safety check result to the camera HAL.

S127. The sensor node of the camera HAL determines the working mode of the TOF camera according to the human eye safety check result.

If the human eye safety check result is safe (normal), it is determined that the working mode of the TOF camera is the face ID mode. If the human eye safety check result is unsafe (abnormal), it is determined that the working mode of the TOF camera is the Tx off mode.

It should be noted that the sensor node may store configuration parameters corresponding to the face ID mode and the Tx off mode.

For example, the configuration parameters corresponding to the face ID mode may be a current value (second current value) being 2800 mA, an IR greyscale image exposure time being 500 µs, depth being yes, and an image exposure time being 800 µs; the configuration parameters corresponding to the Tx off mode may be a current value (third current value) being 0 mA, an IR greyscale image exposure time being 10 µs, depth being no, and an image exposure time being 10 µs.

It should be noted that a sequence of performing S101-S127 is not limited in the embodiments of this application. In some embodiments, S112-S126 may be performed immediately after S101-S107, with S108-S111 performed after S126 and S127 after S111. Certainly, S101-S127 may alternatively be combined in other sequences to ensure that the sensor node of the camera HAL can obtain the human eye safety check result so as to determine the working mode of the TOF camera. These other sequences are not further described in this application one by one.

In the following description, it is assumed that the working mode of the TOF camera determined by the sensor node is the face ID mode. After S127, S128-S144 are further included.

S128. The sensor node sends the configuration parameters of the face ID mode to the camera driver module.

S129. The camera driver module writes the configuration parameters of the face ID mode into registers of the TOF camera to drive the TOF camera to collect data based on the face ID mode.

In other words, the camera driver module may send the configuration parameters of the face ID mode to the TOF camera.

For example, the camera driver module may write the configuration parameters of the face ID mode into the register of the TOF camera through the I2C. In other words, the camera driver module may send the configuration parameters of the face ID mode to the TOF camera through the I2C.

S130. The TOF camera collects raw data 2 based on the face ID mode.

The raw data 2 may be image data (second image data) obtained by the Rx of the TOF camera by receiving reflected light and making an image when the Tx of the TOF camera transmits a light signal to the face during working at the second current value (for example, 2800 mA). A light signal transmitted by the Tx of the TOF camera working at the second current value has a second light intensity. The second light intensity is higher than the first light intensity.

The raw data 2 includes metadata. For example, the metadata stores information such as a current working mode (for example, the face ID mode) of the TOF camera, a lighting current value (for example, 2800 mA), the working state of the TOF camera device (for example, normal), and an image exposure time (for example, 800 µs).

S131. The TOF camera sends the raw data 2 to the IFE module.

For example, the TOF camera may transmit, to the IFE module through the MIPI, the raw data 2 collected by the TOF camera based on the face ID mode.

S132. The IFE module sends the raw data 2 to a secure buffer for storage.

A storage location, of the raw data 2 collected by the TOF camera based on the face ID mode, in the secure buffer may be represented by using an FD2.

The FD2 in this step may be the same as or different from the FD1 in S117. When the FD2 in this step is the same as the FD1 in S117, the raw data 2 collected by the TOF camera based on the face ID mode and the raw data 1 collected by the TOF camera in S117 based on the eye-safe mode are saved into a same secure buffer. The raw data 1 collected by the TOF camera in S117 based on the eye-safe mode may be deleted, so that the raw data 2 collected by the TOF camera based on the face ID mode may be saved into the secure buffer. When the FD2 is different from the FD1, the raw data 2 collected by the TOF camera based on the face ID mode and the raw data 1 collected by the TOF camera in S117 based on the eye-safe mode may be saved into different secure buffers.

S133. The IFE module sends the FD2 to the camera driver module.

S134. The camera driver module sends the FD2 to the IFE node.

S135. The IFE node sends the FD2 to the camera service through the interface of the camera HAL.

S136. The camera service sends the FD2 to the facial recognition control module.

S137. The facial recognition control module sends the FD2 to the face TA.

S138. The face TA fetches the raw data 2 from the secure buffer according to the FD2.

S139. The face TA obtains a facial recognition result based on the raw data 2.

Specifically, the face TA may obtain the working mode of the TOF camera from the metadata in the raw data 2, which, for example, may be the face ID mode. Then, the face TA may process the second image data in the raw data 2 by using the TOF algorithm, to obtain a first greyscale image and a first depth image, and then perform, by using the face ID algorithm, facial recognition based on the first greyscale image, and an anti-counterfeiting check based on the first depth image, to obtain the facial recognition result.

It should be noted that the face TA also stores face information previously enrolled by the user, and the TOF algorithm may convert, into a greyscale image and a depth image, the face information enrolled by the user. If currently collected face information (raw data collected by the TOF camera based on the face ID mode, namely, the raw data 2) matches the greyscale image corresponding to the previously enrolled face information (that is, raw data collected by the electronic device when the user performs a face enrollment operation), the users may be considered to be the same user (that is, the user performing the face enrollment operation is the same as the one performing the unlock operation). In addition, if the currently collected face information includes depth information, it may be considered that the current user is authentic and trusted (not counterfeited by using a photo or a video). In this case, it may be considered that the face of the current user is secure, meaning the facial recognition result is success. If currently collected face information (raw data collected by the TOF camera based on the face ID mode, namely, the raw data 2) does not match the greyscale image corresponding to the previously enrolled face information (that is, raw data collected by the electronic device when the user performs a face enrollment operation), or if the currently collected face information does not include depth information, it is considered that the face of the current user is insecure, meaning the facial recognition result is failure.

S140. The face TA sends the facial recognition result to the facial recognition control module.

S141. The facial recognition control module sends the facial recognition result to the facial recognition service.

The facial recognition control module may transfer the facial recognition result (success or failure) to the facial recognition service based on the callback previously (in S103) registered by the facial recognition service.

S142. The facial recognition service transfers the facial recognition result to the facial recognition SDK.

The facial recognition service transfers the facial recognition result (success or failure) to the facial recognition SDK based on the callback previously (in S102) registered by the facial recognition SDK.

S143. The facial recognition SDK transfers the facial recognition result to the screen lock application.

The facial recognition SDK transfers the facial recognition result (success or failure) to the screen lock application based on the callback previously (in S101) registered by the screen lock application.

S144. The screen lock application determines, according to the facial recognition result, whether to perform unlock.

If the facial recognition result is success, the screen lock application can perform unlock successfully, so that the electronic device may display a home screen or a screen of an application (system application or third-party application). If the facial recognition result is failure, the screen lock application does not perform unlock, meaning face unlock fails. After the face unlock fails, the screen lock application may disable a facial recognition function for a period (for example, 5 minutes) after the facial recognition failure.

Figure 7:
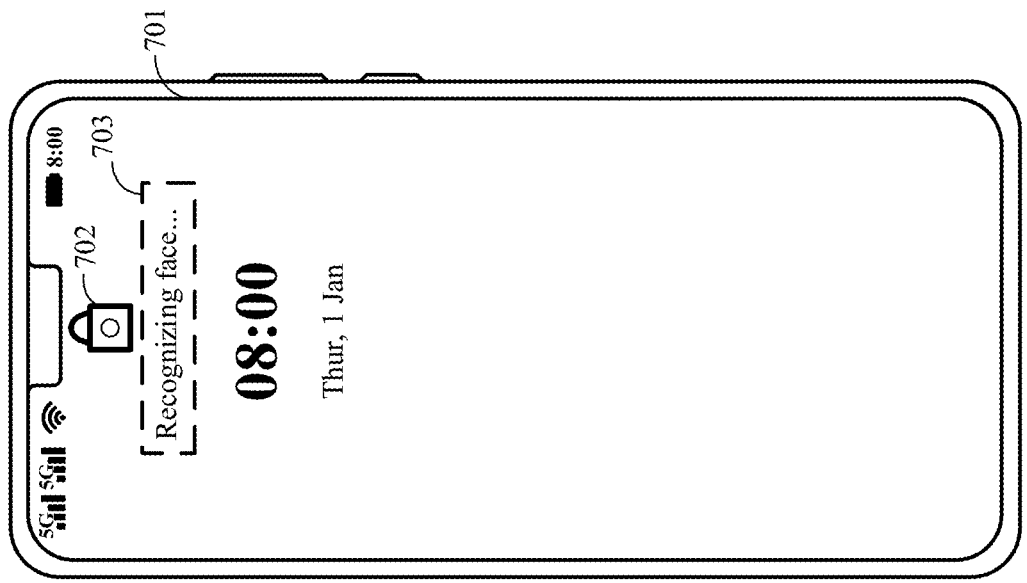
FIG. 7 is a schematic diagram of display according to an embodiment of this application.
Figure 7:
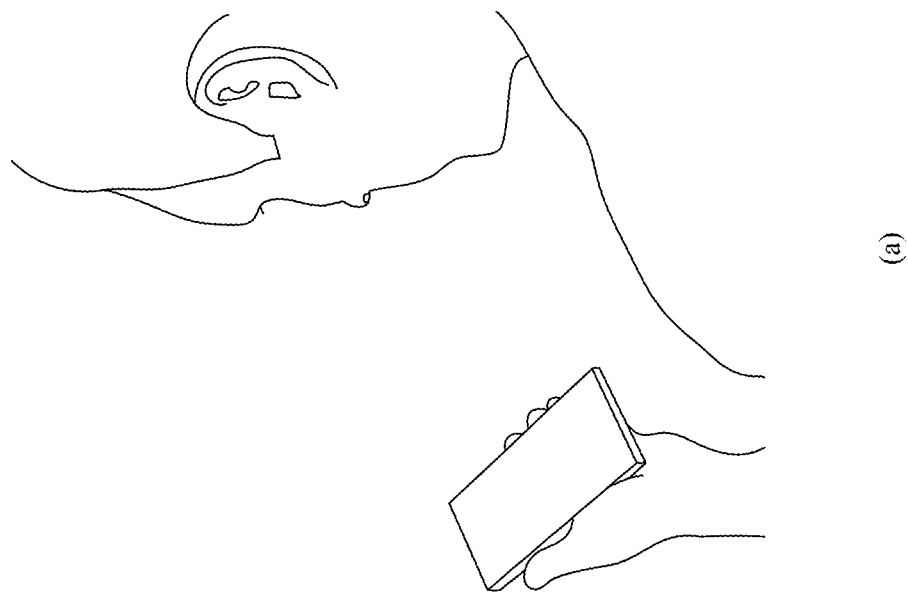

For example, if a user has set face unlock, when the user picks up a mobile phone for facial recognition as shown in (a) in FIG. 7, the mobile phone may display a lock screen 701, as shown in (b) in FIG. 7, in response to the operation of picking up the mobile phone by the user. During a process of the facial recognition performed by the mobile phone, an unlock icon 702 and a text "Recognizing face . . . " 703 may be displayed on the lock screen 701.

Figure 8:
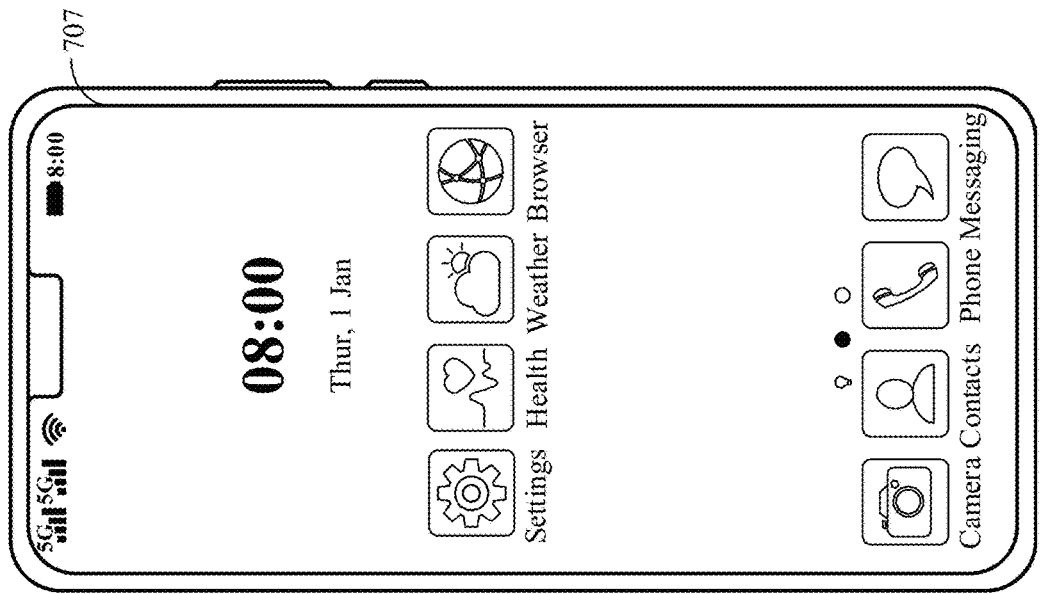
FIG. 8 is another schematic diagram of display according to an embodiment of this application.
Figure 8:
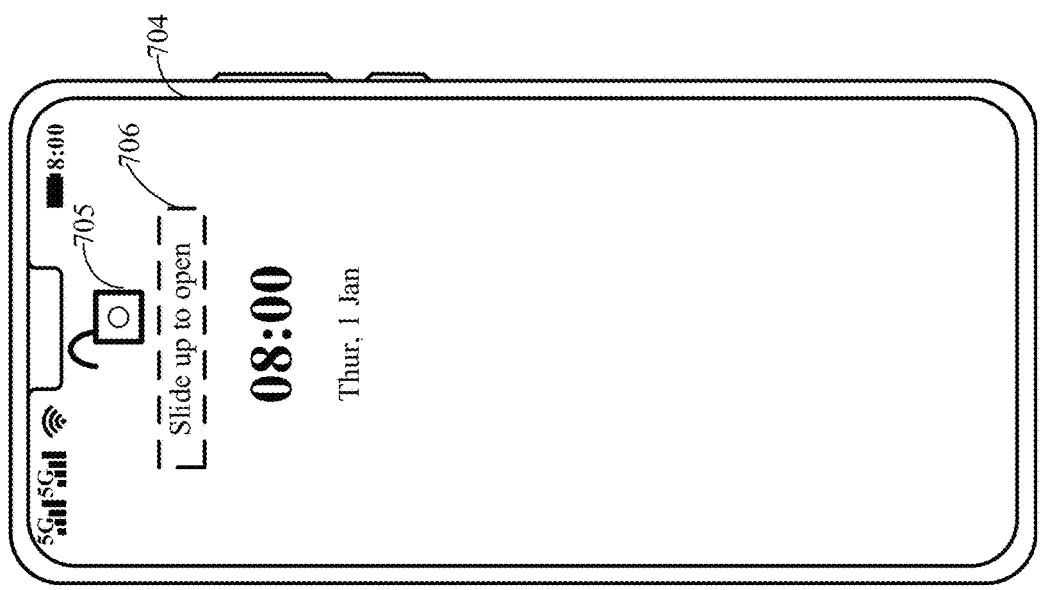

If the facial recognition is successful, a screen 704 may be displayed, as shown in (a) in FIG. 8. The screen 704 may include an unlock icon 705 (in an opened state, which may vividly indicate, to the user, that face unlock is successful) and a text "Slide up to open" 706. In response to a slide-up operation by the user, the mobile phone may display a home screen or a screen of an application (system application or third-party application). Alternatively, if the facial recognition is successful, the mobile phone may be unlocked directly without an additional operation by the user, that is, a home screen 707 may be displayed immediately (or a screen of an application is displayed directly), as shown in (b) in FIG. 8.

Figure 9:
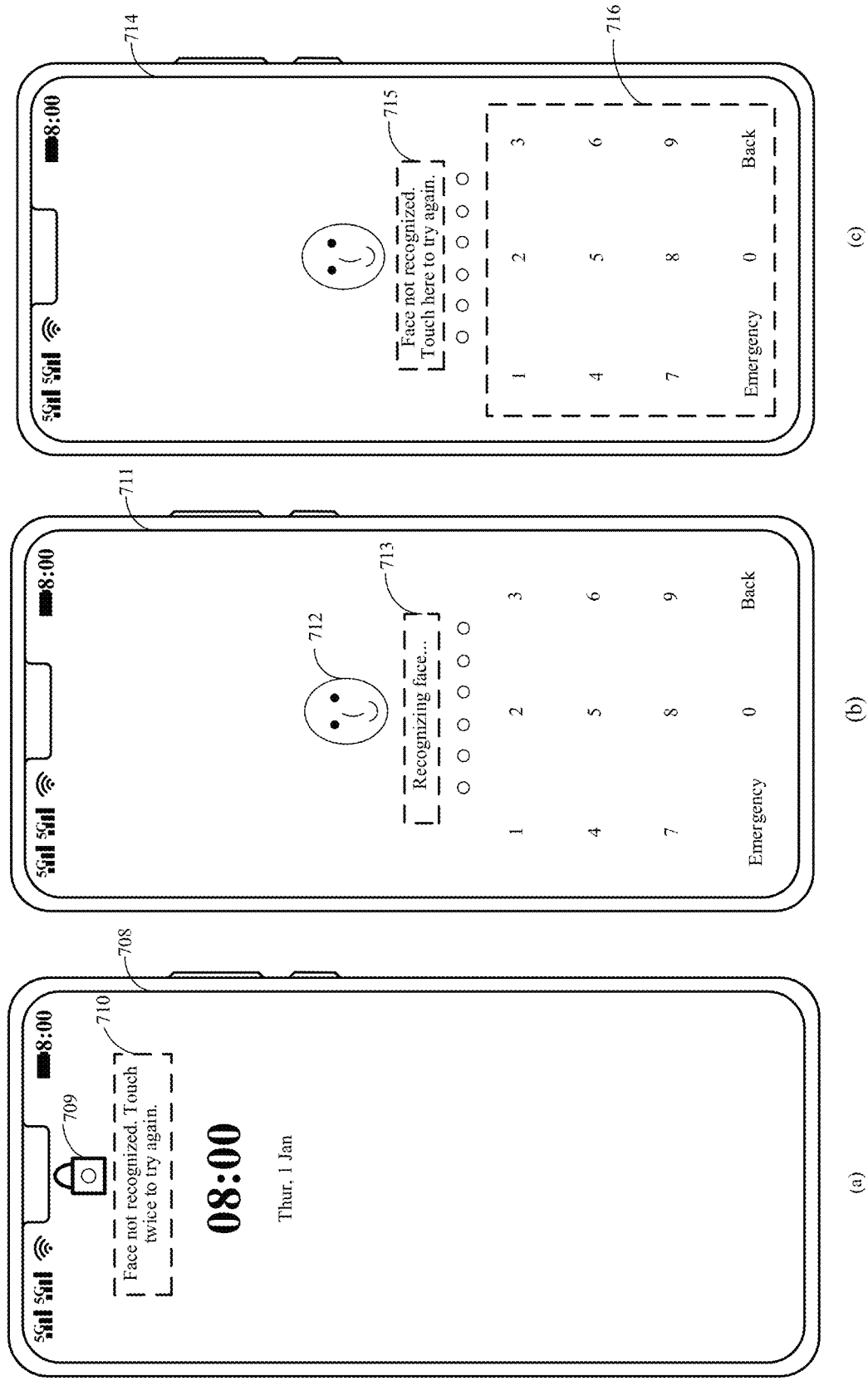
FIG. 9 is another schematic diagram of display according to an embodiment of this application.
Figure 10A:
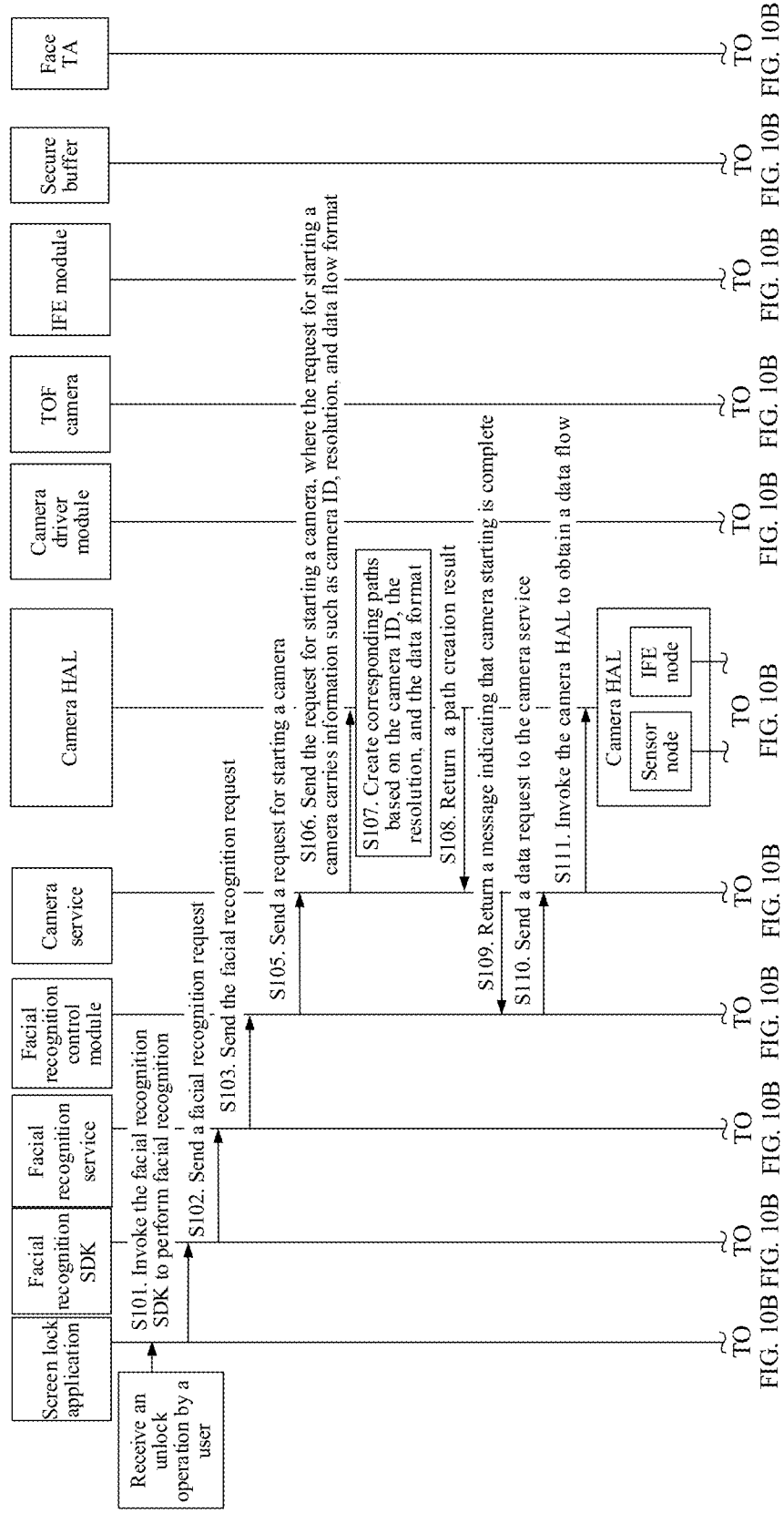
Figure 10C:
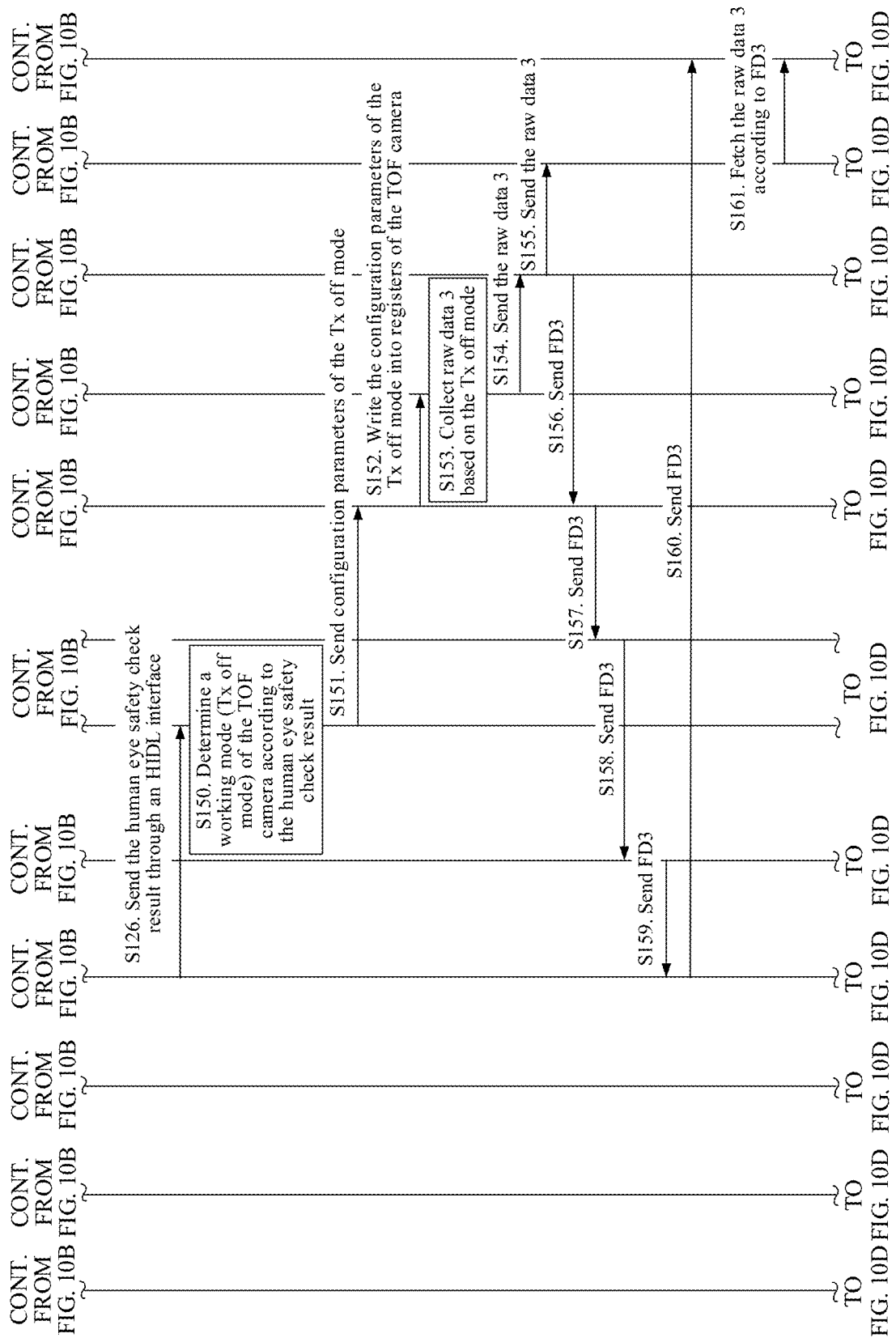
Figure 10D:
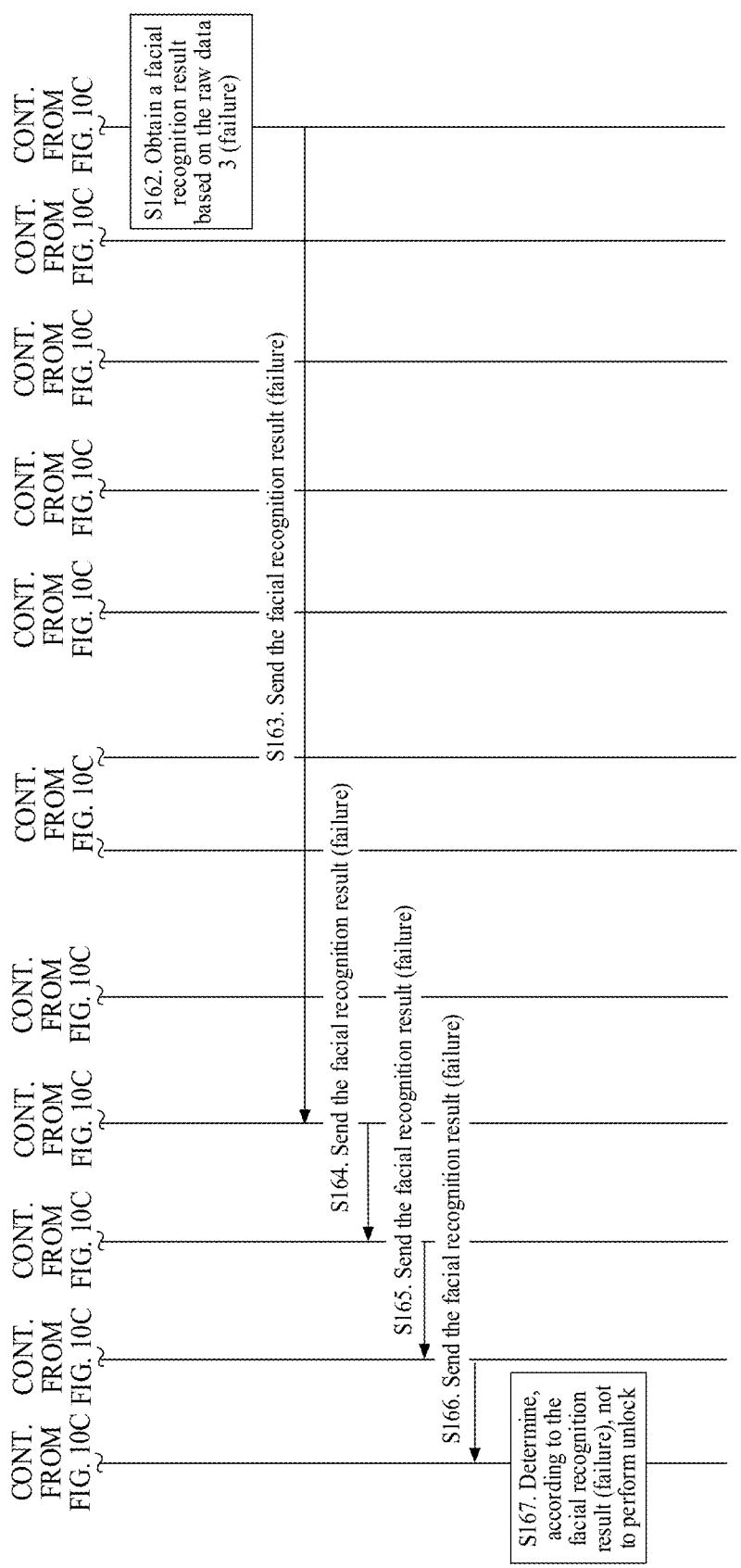

If the facial recognition fails, a screen 708 may be displayed, as shown in (a) in FIG. 9. The screen 708 may include an unlock icon 709 (in a closed state, which may vividly indicate, to the user, that face unlock is unsuccessful) and a text "Face not recognized. Touch twice to try again" 710. In response to a double-touch operation by the user, the mobile phone may perform facial recognition again (that is, collect face information of the user again to perform a comparison and anti-counterfeiting determining). Alternatively, in response to a slide-up operation by the user on the screen 708, the mobile phone may display a screen 711, as shown in (b) in FIG. 9. After access to the screen 711, the mobile phone may perform facial recognition again. The screen 711 may include a facial recognition icon 712 and a text "Recognizing face . . . " 713. If the recognition is still not successful, the mobile phone may display a screen 714, as shown in (c) in FIG. 9. The screen 714 may include a text "Face not recognized. Touch here to try again" 715. The user may touch the corresponding position to trigger facial recognition again, or may enter, by using a soft keyboard 716, a password to perform unlock to avoid a problem that recognition being always unsuccessful results in poor user experience.

It should be noted that the foregoing embodiment describes, by using the method process of the screen lock application performing face unlock as an example, selection of a working mode for the TOF camera. Selection of a working mode for a TOF camera may also be applied to scenarios such as facial recognition during payment or transfer (for example, a user performs a payment or transfer operation in a payment application, wealth management application, chat application, or shopping application (for example Alipay®, WeChat®, and Taobao®)) and face verification during a user's secure registration with or login to an application program (for example, a user performs a registration or login operation in Bank of China®). This is not limited in this application. In other words, the screen lock application may be replaced by a shopping application, a chat application, a payment application, a bank application, a wealth management application, or the like. This is not limited in this application.

In the following description, it is assumed that the working mode of the TOF camera determined by the sensor node is the Tx off mode. As shown in FIG. 10A to FIG. 10D, after S126, S150-S167 are further included.

S150. The sensor node of the camera HAL determines, based on the human eye safety check result, that the working mode of the TOF camera is the Tx off mode.

S151. The sensor node sends the configuration parameters of the Tx off mode to the camera driver module.

S152. The camera driver module writes (updates) the configuration parameters of the Tx off mode into registers of the TOF camera to drive the TOF camera to collect data.

In other words, the camera driver module may send the configuration parameters of the Tx off mode to the TOF camera.

For example, the camera driver module may write the configuration parameters of the Tx off mode into the registers of the TOF camera through I2C, that is, send the configuration parameters of the Tx off mode to the TOF camera through I2C.

S153. The TOF camera collects raw data 3 based on the Tx off mode.

The raw data 3 may be image data (third image data) obtained by the Rx of the TOF camera by receiving reflected light (in the absence of transmitted light and ambient transmitted light) and making an image when the Tx of the TOF camera is not being energized and not transmitting light, and is usually a "black picture" without a clear face image.

The raw data 3 includes metadata. For example, the metadata stores information such as a current working mode (for example, the Tx off mode) of the TOF camera, a lighting current value (the third current value) (for example, 0 mA), the working state of the TOF camera device (for example, abnormal), and an image exposure time (for example, 10 μs).

S154. The TOF camera sends the raw data 3 to the IFE module.

For example, the TOF camera may send, to the IFE module through the MIPI, the raw data 3 collected by the TOF camera.

S155. The IFE module sends the raw data 3 to a secure buffer for storage.

A storage location, of the raw data 3 collected by the TOF camera based on the Tx off mode, in the secure buffer may be represented by using an FD3.

The FD3 in this step may be the same as or different from the FD1 in S117. When the FD3 in this step is the same as the FD1 in S117, the raw data 3 collected by the TOF camera based on the Tx off mode and the raw data 1 collected by the TOF camera in S117 based on the eye-safe mode are saved into a same secure buffer. The raw data 1 collected by the TOF camera in S117 based on the eye-safe mode may be deleted, so that the raw data 3 collected by the TOF camera based on the Tx off mode may be saved into the secure buffer. When the FD3 is different from the FD1, the raw data 3 collected by the TOF camera based on the Tx off mode and the raw data 1 collected by the TOF camera in S117 based on the eye-safe mode may be saved into different secure buffers.

S156. The IFE module sends the FD3 to the camera driver module.

S157. The camera driver module sends the FD3 to the IFE node.

S158. The IFE node sends the FD3 to the camera service through the interface of the camera HAL.

S159. The camera service sends the FD3 to the facial recognition control module.

S160. The facial recognition control module sends the FD3 to the face TA.

S161. The face TA fetches the raw data 3 from the secure buffer according to the FD3.

S162. The face TA obtains a facial recognition result based on the raw data 3.

Specifically, the face TA may obtain, from the metadata in the raw data 3 collected by the TOF camera based on the Tx off mode, the current working mode being the Tx off mode, then obtain a second greyscale image and a second depth image by using the TOF algorithm and based on the third image data, and perform, by using the face ID algorithm, facial recognition based on the second greyscale image and an anti-counterfeiting check based on the second depth image, to obtain the facial recognition result.

It should be noted that when the TOF camera is working in the Tx off mode, the facial recognition result is failure. This is because the TOF camera cannot transmit light in the Tx off mode, so the TOF camera cannot collect a clear face image. Even if the current user requesting unlock is an authenticated user (that is, the owner of the electronic device), the facial recognition result is still failure.

S163. The face TA transfers the facial recognition result (which is failure) to the facial recognition control module.

In other words, the face TA may notify the facial recognition control module that the facial recognition result is failure.

S164. The facial recognition control module transfers the facial recognition result (which is failure) to the facial recognition service.

The facial recognition control module transfers the facial recognition result (which is failure) to the facial recognition service based on the callback previously registered by the facial recognition service. In other words, the facial recognition control module notifies the facial recognition service that the facial recognition result is failure.

S165. The facial recognition service transfers the facial recognition result (which is failure) to the facial recognition SDK.

The facial recognition service transfers the facial recognition result (which is failure) to the facial recognition SDK based on the callback previously registered by the facial recognition SDK. In other words, the facial recognition service may notify the facial recognition SDK that the facial recognition result is failure.

S166. The facial recognition SDK transfers the facial recognition result (which is failure) to the screen lock application.

The facial recognition SDK transfers the facial recognition result (which is failure) to the screen lock application based on the callback previously registered by the screen lock application. In other words, the facial recognition SDK may notify the screen lock application that the facial recognition result is failure.

S167. The screen lock application determines, according to the facial recognition result (which is failure), not to perform unlock.

Because the facial recognition result is failure, the screen lock application does not perform unlock.

For example, if the facial recognition fails, a screen 708 may be displayed, as shown in (a) in FIG. 9. The screen 708 may include an unlock icon 709 (in a closed state, which may vividly indicate, to the user, that face unlock is unsuccessful) and a text "Face not recognized. Touch twice to try again" 710. In response to a double-touch operation by the user, the mobile phone may perform facial recognition again (that is, collect face information of the user again to perform a comparison and anti-counterfeiting determining). Alternatively, in response to a slide-up operation by the user on the screen 708, the mobile phone may display a screen 711. After access to the screen 711, the mobile phone may perform facial recognition again. The screen 711 may include a facial recognition icon 712 and a text "Recognizing face . . . " 713. If the recognition is still not successful, the mobile phone may display a screen 714. The screen 714 may include a text "Face not recognized. Touch here to try again" 715. The user may touch the corresponding position to trigger facial recognition again, or may enter, by using a soft keyboard 716, a password to perform unlock to avoid a problem that recognition being always unsuccessful results in poor user experience.

Some embodiments of this application provide an electronic device. The electronic device may include a touchscreen, a memory, and one or more processors. The touchscreen and the memory are coupled to the processor. The memory is configured to store computer program code, and the computer program code includes a computer instruction. When the processor executes the computer instruction, the electronic device may perform the functions or steps performed by the electronic device in the foregoing method embodiment. For a structure of the electronic device, reference may be made to the structure of the electronic device 100 shown in FIG. 1.

Figure 11:
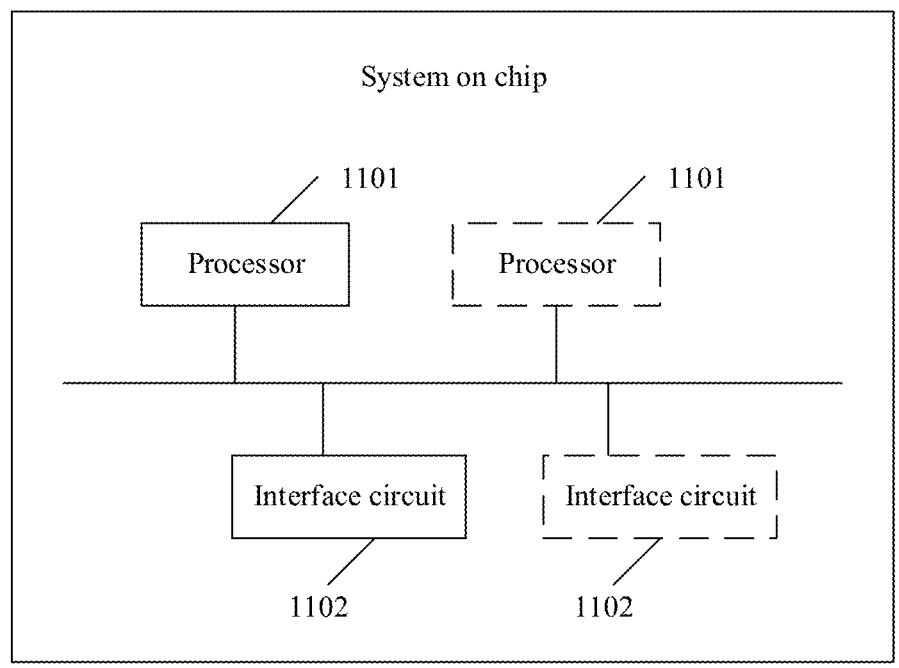
FIG. 11 is a schematic structural diagram of a chip according to an embodiment of this application.

An embodiment of this application further provides a chip system (for example, a system on a chip (system on a chip, SoC)). As shown in FIG. 11, the chip system includes at least one processor 1101 and at least one interface circuit 1102. The processor(s) 1101 and the interface circuit(s) 1102 may be interconnected by lines. For example, the interface circuit 1102 may be configured to receive a signal from another apparatus (for example, a memory of an electronic device). For another example, the interface circuit 1102 may be configured to send a signal to another apparatus (for example, the processor 1101 or a touchscreen of an electronic device). For example, the interface circuit 1102 may read an instruction stored in the memory and send the instruction to the processor 1101. When the instruction is executed by the processor 1101, the electronic device is caused to perform the steps in the foregoing embodiments. Certainly, the system on chip may further include other discrete devices. This is not specifically limited in this embodiment of this application.

An embodiment of this application further provides a TOF camera, where the TOF camera may be configured to implement the eye-safe mode, the face ID mode, the TX off mode, and the like in the foregoing embodiments. An electronic device in which the TOF camera is installed may perform the functions or steps performed by the electronic device in the foregoing method embodiments.

An embodiment of this application further provides a computer-readable storage medium. The computer-readable storage medium includes computer instructions. When the computer instructions run on the foregoing electronic device, the electronic device is caused to perform the functions or steps performed by the electronic device in the foregoing method embodiments.

An embodiment of this application further provides a computer program product. When the computer program product runs on an electronic device, the electronic device is caused to perform the functions or steps performed by the electronic device in the foregoing method embodiments.

Based on the description of the foregoing implementations, a person skilled in the art can clearly understand that, for convenience and brevity of description, the foregoing division of function modules is used as only an example for description. In actual application, the foregoing functions may be allocated as required to different function modules for implementation. This means that an internal structure of the apparatus is divided into different function modules to implement all or part of the functions described above.

In the several embodiments provided in this application, it should be understood that the disclosed apparatus and method may be implemented in other manners. For example, the apparatus embodiments described above are merely examples. For example, the division of modules or units is merely logical function division, and there may be other division manners during actual implementation. For example, a plurality of units or components may be combined or may be integrated into another apparatus, or some features may be ignored or not be performed. In addition, the displayed or discussed mutual couplings or direct couplings or communication connections may be indirect couplings or communication connections implemented through some interfaces, apparatuses, or units, and may be implemented in electronic, mechanical, or other forms.

The units described as separate parts may be or may not be physically separate, and parts displayed as units may be one physical unit or a plurality of physical units, that is, the parts may be located in one position or distributed in a plurality of different positions. Some or all of the units may be selected according to actual requirements to achieve the objectives of the solutions of the embodiments.

In addition, the functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in the embodiments of this application essentially, or the part contributing to the prior art, or all or part of the technical solutions may be implemented in a form of a software product. The software product is stored in a storage medium and includes several instructions used for instructing a device (which may be a single-chip microcomputer, a chip, or the like) or a processor (processor) to perform all or part of the steps of the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing content is merely specific implementations of this application, but is not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A facial recognition method, applied to an electronic device, wherein the electronic device comprises a time of flight (TOF) camera module, and the TOF camera module comprises a transmitter configured to transmit a light signal and an image sensor configured to receive reflected light; and the method comprises:
   receiving a first operation by a user, wherein the first operation triggers the TOF camera module to work and initiates performing facial recognition through the TOF camera module;
   controlling the transmitter to work at a first current value that is associated with a first light intensity;
   determining that the transmitter is in a normal working state when the transmitter is working at the first light intensity;
   in response to determining that the transmitter is in the normal working state, controlling the transmitter to work at a second current value that is associated with a second light intensity that is higher than the first light intensity;
   controlling the image sensor to collect image data when the transmitter is working at the second light intensity; and
   performing the facial recognition based on the image data collected when the transmitter is working at the second light intensity.

2. The method according to claim 1, wherein the first current value and the second current value are associated with respective electric current values.

3. The electronic device of claim 1, further comprising a wireless communications module, a memory, and one or more processors, the wireless communications module and the memory being coupled to the processor
   the memory is configured to store computer program code, and the computer program code comprises a computer instruction; and when the computer instruction is executed by the processor, the electronic device is caused to perform the method according to claim 1.

4. A non-transitory computer-readable storage medium, comprising computer instructions, wherein
   when the computer instructions run on the electronic device according to claim 1, and the electronic device is caused to perform the method according to claim 1.

5. The method according to claim 2, wherein the method further comprises:
   controlling the transmitter to work at a first greyscale image exposure time when controlling the transmitter to work at the first current value that is associated with a first light intensity.

6. The method according to claim 1, wherein the method further comprises controlling the transmitter to work at a depth image exposure time when controlling the transmitter to work at the first current value that is associated with a first light intensity.

7. The method according to claim 1, wherein the TOF camera module is a front-facing camera module.

8. The method according to claim 1, wherein the electronic device comprises a camera driver module, and wherein before controlling the transmitter to work at a second current value, the method further comprises:
   writing, by the camera driver module, configuration parameters of the second current value into registers of the TOF camera module through an inter-integrated circuit (I2C).

9. The method according to claim 1, wherein the determining the working state of the transmitter comprises:
   obtaining a first parameter of the transmitter; and
   determining that the transmitter is in the normal working state in response to the first parameter comprising a value indicating that the transmitter is in the normal working state.

10. The method according to claim 9, further comprising:
    determining that the transmitter is in an abnormal working state in response to the first parameter comprising a second value indicating that the transmitter is in the abnormal working state; and
    controlling the transmitter to work at a third current value 0, in response to the transmitter being in the abnormal working state;
    controlling the image sensor to collect image data while working under the third current value; and
    performing the facial recognition based on the image data collected while working under the third current value.

11. The method according to claim 6, wherein the performing the facial recognition based on the image data comprises:
    obtaining a greyscale image and a depth image based on the image data; and
    performing a face comparison based on the greyscale image and performing an anti-counterfeiting check based on the depth image, to obtain a facial recognition result.

12. The method according to claim 11, wherein
    the first operation is associated with an operation for unlocking the electronic device, an operation for online payment, an operation for face enrollment, or an operation for secure registration with or login to an application program.

13. The method according to claim 12, wherein the method further comprises:
    in response to the facial recognition result indicating success, performing unlock; and in response to the facial recognition result indicating failure, displaying an unlock failure or skipping performing unlock; or
    in response to the facial recognition result indicating success, performing a payment; and in response to the facial recognition result indicating failure, displaying a payment failure or skipping performing payment; or
    in response to the facial recognition result indicating success, performing face enrollment; and in response to the facial recognition result indicating failure, displaying a face enrollment failure or skipping performing face enrollment; or
    in response to the facial recognition result indicating success, performing registration or login; and in response to the facial recognition result indicating failure, displaying a registration or login failure or skipping performing registration or login.

14. The method according to claim 10, wherein the method further comprises:
    in response to the transmitter being in the abnormal working state, alerting the user of an unlock failure; or alerting the user of a payment failure; or alerting the user of a face enrollment failure; or alerting the user of a registration or login failure.

15. The method according to claim 14, wherein the electronic device comprises a camera hardware abstraction layer (HAL) and a camera driver module, the camera HAL comprising a sensor node, and the controlling the transmitter to work at a first current value comprises:
   determining, by the sensor node, a working mode of the TOF camera module to be a first working mode, wherein the first working mode is used to indicate that the transmitter is to work at the first current value;
   sending, by the sensor node, configuration parameters of the first working mode to the camera driver module;
   writing, by the camera driver module, the configuration parameters of the first working mode into registers of the TOF camera module through the I2C;
   sending, by the camera driver module to the sensor node, a message indicating that writing the configuration parameters is complete;
   in response to receiving the message indicating that writing the configuration parameters is complete, sending, by the sensor node, a first stream on command to the camera driver module;
   sending, by the camera driver module, a second stream on command to the TOF camera module; and
   working, by the transmitter, at the first current value, wherein a light signal transmitted by the transmitter working at the first current value has the first light intensity.

16. The method according to claim 15, wherein the electronic device further comprises a first application, a facial recognition software development kit (SDK), a facial recognition service, a facial recognition control module, and a camera service, and after the receiving the first operation by the user, the method further comprises:
   invoking, by the first application, the facial recognition SDK to perform the facial recognition, wherein the first application corresponds to the first operation, and the first application comprises a screen lock application, a shopping application, a chat application, or a wealth management application;
   sending, by the facial recognition SDK, a facial recognition request to the facial recognition service, wherein the facial recognition request carries a facial recognition type identifier, an image resolution, and a data flow format;
   sending, by the facial recognition service, the facial recognition request to the facial recognition control module;
   matching, by the facial recognition control module, a camera module according to the facial recognition request;
   sending, by the facial recognition control module to the camera service, a first request for starting a camera module, wherein the first request for starting a camera module carries a security flag, a camera module identifier ID, an image resolution, and a data flow format, and the security flag is used for requesting a secure buffer; and
   sending, by the camera service to the camera HAL, a second request for starting a camera module, wherein the second request carries the security flag, the camera module identifier ID, the image resolution, and the data flow format.

17. The method according to claim 16, wherein the determining, by the sensor node, the working mode of the TOF camera module to be the first working mode specifically comprises:
   determining, by the sensor node according to the image resolution, the data flow format, and a preset rule, the working mode of the camera module to be the first working mode.

18. The method according to claim 17, wherein after the sending, by the camera service to the camera HAL, a second request for starting a camera module, the method further comprises:
   creating, by the camera HAL based on the camera module ID, the image resolution, and the data flow format, a path for transmitting a data flow and a path for transmitting a control flow;
   returning, by the camera HAL, a path creation result to the camera service, wherein the path creation result is success;
   returning, by the camera service to the facial recognition control module, a message indicating that camera module starting is complete;
   sending, by the facial recognition control module, a data request to the camera service, wherein the data request is used to obtain the data flow; and
   invoking, by the camera service, the camera HAL to obtain the data flow.

19. The method according to claim 18, wherein the controlling the transmitter to work at a second current value comprises:
   in response to receiving a working state of the transmitter which is the normal working state, determining, by the camera HAL, the working mode of the camera module to be a second working mode, wherein the second working mode indicates that the transmitter is to work at the second current value;
   sending, by the camera HAL, configuration parameters of the second working mode to the camera driver module;
   writing, by the camera driver module, the configuration parameters of the second working mode into registers of the TOF camera module through the I2C;
   sending, by the camera driver module to the sensor node, a message indicating that writing the configuration parameters is complete;
   in response to receiving the message indicating that writing the configuration parameters is complete, sending, by the sensor node, a third stream on command to the camera driver module;
   sending, by the camera driver module, a fourth stream on command to the TOF camera module; and
   working, by the transmitter, at the second current value, wherein a light signal transmitted by the transmitter working at the second current value has the second light intensity.

20. The method according to claim 19, wherein the controlling the transmitter to work at a third light intensity when the transmitter is in the abnormal working state specifically comprises:
   in response to determining that the transmitter is in the abnormal working state, determining, by the camera HAL, the working mode of the camera module to be a third working mode, wherein the third working mode is used to indicate that the transmitter is to work at a third current value, and the third current value is 0;
   sending, by the camera HAL, configuration parameters of the third working mode to the camera driver module;

writing, by the camera driver module, the configuration parameters of the third working mode into registers of the TOF camera module through the I2C;

sending, by the camera driver module to the sensor node, a message indicating that writing the configuration parameters is complete;

in response to receiving the message indicating that writing the configuration parameters is complete, sending, by the sensor node, a fifth stream on command to the camera driver module;

sending, by the camera driver module, a sixth stream on command to the TOF camera module; and stopping working, by the transmitter.

* * * * *